United States Patent
Hui

(10) Patent No.: US 8,482,214 B2
(45) Date of Patent: Jul. 9, 2013

(54) APPARATUS AND METHODS OF OPERATION OF PASSIVE LED LIGHTING EQUIPMENT

(75) Inventor: Ron Shu Yuen Hui, Shatin (HK)

(73) Assignee: City University of Hong Kong, Kowloon (HK)

(*) Notice: Subject to any disclaimer, the term of this patent is extended or adjusted under 35 U.S.C. 154(b) by 637 days.

(21) Appl. No.: 12/544,545

(22) Filed: Aug. 20, 2009

(65) Prior Publication Data
US 2010/0270941 A1   Oct. 28, 2010

Related U.S. Application Data

(63) Continuation-in-part of application No. 12/474,001, filed on May 28, 2009, now abandoned, which is a continuation-in-part of application No. 12/429,792, filed on Apr. 24, 2009, now abandoned.

(51) Int. Cl.
H05B 37/02   (2006.01)

(52) U.S. Cl.
USPC ............ 315/291; 315/201; 315/224; 315/247

(58) Field of Classification Search
USPC ................. 315/201, 224, 247, 291, 294, 297, 315/208
See application file for complete search history.

(56) References Cited

U.S. PATENT DOCUMENTS

| | | | |
|---|---|---|---|
| 6,201,368 B1 * | 3/2001 | Webster | 318/729 |
| 6,316,883 B1 * | 11/2001 | Cho et al. | 315/247 |
| 6,856,103 B1 * | 2/2005 | Hudson et al. | 315/308 |
| 7,274,154 B2 * | 9/2007 | Atra et al. | 315/224 |
| 7,719,202 B2 * | 5/2010 | Cheng et al. | 315/291 |
| 7,911,149 B2 * | 3/2011 | Schaible et al. | 315/224 |
| 8,030,853 B1 * | 10/2011 | Wong et al. | 315/247 |
| 2007/0152604 A1 * | 7/2007 | Tatsumi | 315/247 |
| 2008/0018261 A1 * | 1/2008 | Kastner | 315/192 |
| 2008/0224629 A1 * | 9/2008 | Melanson | 315/247 |

OTHER PUBLICATIONS

Chung, et al., "Comparison of Dimmable Electromagnetic and Electronic Ballast Systems—An Assessment on Energy Efficiency and Lifetime," IEEE Transactions on Industrial Electronics. vol. 54. No. 6. Dec. 2007, pp. 3145-3154.

S.Y.R. Hui and W. Yan, "Re-examination on Energy Saving & Environmental Issues in Lighting Applications," Department of Electronic Engineering, City University of Hong Kong, 2 pages, 2007.

(Continued)

*Primary Examiner* — Don Le
(74) *Attorney, Agent, or Firm* — Heslin Rothenberg Farley & Mesiti P.C.

(57) ABSTRACT

This invention is concerned with the control and design of a LED lighting system that does not need electrolytic capacitors in the entire system and can generate light output with reduced luminous flux fluctuation. The proposal is particularly suitable, but not restricted to, off-line applications in which the lighting system is powered by the ac mains. By eliminating electrolytic capacitors which have a limited lifetime of typically 15000 hours, the proposed system can be developed with passive and robust electrical components such as inductor and diode circuits, and it features long lifetime, low maintenance cost, robustness against extreme temperature variations and good power factor. No extra electronic control board is needed for the proposed passive circuits, which can become dimmable systems if the ac input voltage can be adjusted by external means.

42 Claims, 28 Drawing Sheets

OTHER PUBLICATIONS

Dos Reis, et al., "Single Stage Ballast for High Pressure Sodium Lamps," The 30$^{th}$ Annual Conference of the IEEE Industrial Electronics Society. Nov. 2-6, 2004, Busan, Korea, pp. 2888-2893.

Jinrong Qian and Fred C. Lee, "A High Efficient Single Stage Single Switch High Power Factor AC/DC Converter with Universal Input*," Virginia Power Electronics Center, The Bradley Department of Electrical Engineering, Virginia Polytechnic Institute and State University, Blacksburg, VA 24061-0111. pp. 281-287, 1997.

Chongming Qiao and Keyue Ma Smedley, "A Topology Survey of Single-Stage Power Factor Corrector with a Boost Type Input-Current-Shaper," IEEE Transactions on Power Electronics, vol. 16. No. 3. May 2001. pp. 360-368, 2001.

C.K. Tse and M.H.L. Chow, "Single Stage High Power Factor Converter Using the Sheppard-Taylor Topology," Department of Electronic Engineering, Hong Kong Polytechnic University, Hong Kong, pp. 1191-1197, 1996.

K. Kit Sum, "Improved Valley-Fill Passive Current Shaper," Consultant, P.O. Box 361110, Milpitas. California 95036-1110, pp. 1-8, 1997.

John Lam and Praveen K. Jain, "A New Passive Valley Fill Dimming Electronic Ballast with Extended Line Current Conduction Angle," Power Electronics Applied Research Laboratory (PEARL), Queen's University, Kingston, Canada, 7 pages, 2006.

National Semiconductor Corporation, "LM3445 Triac Dimmable Offline LED Driver," May 23, 2009, 26 pages.

David C. Hamill and Philip T. Krein, "A 'Zero' Ripple Technique Applicable to Any DC Converter," Surrey Space Centre, University of Surrey, Guildford, UK; Dept. of Electrical and Computer Engineering, University of Illinois, Urbana, Illinois, USA, pp. 1165-1171, 2009.

Schutten et al., "Ripple Current Cancellation Circuit," GE Global Research Center. 1 Research Center, Niskayuna, NY 12309, pp. 464-470, 2003.

Cheng, et al., "A New Improved Boost Converter with Ripple Free Input Current Using Coupled Inductors." Department of Electrical Engineering, The Hong Kong Polytechnic University, Hong Kong; Department of Electrical Engineering, Tsinghua University, P.R. China, pp. 592-599, 2009.

S.Y.R. Hui and Y.X. Qin. "A General Photo-Electro-Thermal Theory for Light Emitting Diode (LED) Systems," Centre for Power Electronics, City University of Hong Kong, Hong Kong, China, 9 pages, 2009.

K.I. Hwu and Sheng-Chien Chou, "A Simple Current-Balancing Converter for LED Lighting," Center for Power Electronics Technology, National Taipei University of Technology, Taiwan, pp. 587-590, 2009.

* cited by examiner $i_1$ — dc current with ac ripple $i_2$ — Coupled ac ripple current in out of phase of $i_1$ $i_o$ — Resultant current with ac ripple reduction switches for tapping control

APPARATUS AND METHODS OF OPERATION OF PASSIVE LED LIGHTING EQUIPMENT

CROSS-REFERENCE TO RELATED APPLICATIONS

This application is a continuation-in-part of U.S. patent application Ser. No. 12/474,001, filed May 28, 2009, which is a continuation-in-part of U.S. patent application Ser. No. 12/429,792, filed Apr. 24, 2009, each of which is hereby incorporated herein by reference in its entirety.

FIELD OF THE INVENTION

This invention relates to apparatus and methods for the operation of passive light emitting diode (LED) lighting equipment, and in particular to such apparatus and methods as may avoid the need to use electrolytic capacitors.

BACKGROUND OF THE INVENTION

LED technology has been promoted as a promising lighting technology to replace energy-inefficient incandescent lamps and mercury-based linear and compact fluorescent lamps. It is often claimed by LED manufacturers that the LED devices have a long lifetime that could be higher than 5 years. However, the electrolytic capacitors used in the power circuit and the electronic controls for LED systems have a limited lifetime, typically 15000 hours (or 1.7 years) at an operating temperature of 105° C. The lifetime of an electrolytic capacitor is highly sensitive to the operating temperature. The lifetime is doubled if the operating temperature is decreased by 10° C. and halved if increased by 10° C. Therefore, the short lifetime of electronic control circuits (sometimes known as ballasts) for LEDs remains one major bottleneck in the utilization of LED technology [Chung, H. S.-H.; Ho, N.-M.; Yan, W.; Tam, P. W.; Hui, S. Y.; "Comparison of Dimmable Electromagnetic and Electronic Ballast Systems—An Assessment on Energy Efficiency and Lifetime", IEEE Transactions on Industrial Electronics, Volume 54, Issue 6, December 2007 Page(s): 3145-3154; Hui S. Y. R. and Yan W., "Re-examination on Energy Saving & Environmental Issues in Lighting Applications", Proceedings of the 11$^{th}$ International Symposium on Science 7 Technology of Light Sources, May 2007, Shanghai, China (Invited Landmark Presentation), pp. 373-374].

In general, electrolytic capacitors are used in power inverter circuits and electronic control circuits for lighting systems because they provide the necessary large capacitance of the order of hundreds and even thousands of micro-Farads, while other more long-lasting capacitors such as ceramic, polypropylene and metalized plastic film capacitors have relatively less capacitance of several tens of micro-Farads or less. The large capacitance of electrolytic capacitors is usually needed to provide a stable dc link voltage for the ballast circuit to provide stable power (with reduced power variation) for the load; a stable dc power supply in the electronic control for the power inverter circuit.

FIG. 1 shows the schematic of a typical off-line lighting system. An off-line system here means a system that can be powered by the ac mains. The power conversion circuit can adopt a two-stage approach in which an AC-DC power stage with power factor correction is used as the first power stage, which is followed by a second dc-dc power conversion stage for controlling the current for LED load. An alternative to the two-stage approach is to employ a single-stage approach which combines the two power stages into one and such a technique has been reported in many off-line power supply designs [Reis, F. S. D.; Lima, J. C.; Tonkoski, R., Jr.; Canalli, V. M.; Ramos, F. M.; Santos, A.; Toss, M.; Sarmanho, U.; Edar, F.; Lorenzoni, L.; "Single stage ballast for high pressure sodium lamps", IECON 2004. 30th Annual Conference of IEEE Industrial Electronics Society, 2004. Volume 3, 2-6 Nov. 2004 Page(s): 2888-2893 Vol. 3; Jinrong Qian; Lee, F. C.; "A high efficient single stage single switch high power factor AC/DC converter with universal input", Twelfth Annual Applied Power Electronics Conference and Exposition, 1997. APEC '97 Conference Proceedings 1997, Volume 1, 23-27 Feb. 1997 Page(s): 281-287; Qiao, C.; Smedley, K. M.; "A topology survey of single-stage power factor corrector with a boost type input-current-shaper", IEEE Transactions on Power Electronics, Volume 16, Issue 3, May 2001 Page(s): 360-368; Tse, C. K.; Chow, M. H. L.; "Single stage high power factor converter using the Sheppard-Taylor topology", 27th Annual IEEE Power Electronics Specialists Conference, 1996. PESC '96 Record., Volume 2, 23-27 Jun. 1996 Page(s): 1191-1197 vol. 2]. In both approaches, electrolytic capacitors are used to provide the energy storage and buffer so that the difference between the input power and the output power consumed by the load can be stored or delivered by the capacitors.

Regardless of whether a single-stage or a two-stage approach is used, a large capacitance (requiring the use of electrolytic capacitors) is needed as energy-storage to cater for the difference between the input power from the ac mains and the almost constant power of the LED load. The input power of an off-line lighting system is typically a periodically pulsating function as shown in FIG. 1. For example, if power factor is close to one, the input voltage and current are in phase and thus the input power follows a pulsating waveform (similar to a rectified sinusoidal waveform). If the lighting load is of constant power, then the capacitors are needed to absorb or deliver the difference in power between the ac mains and the lighting load as shown in FIG. 1.

An electronic ballast circuit without the use of electrolytic capacitors has been proposed. But the requirement for active power switches in such proposal means that an electronic control board that provides the switching signals for the active power switches is needed and this electronic control board needs a power supply that requires the use of electrolytic capacitors. In general, electrolytic capacitors are needed in a dc power supply for providing the hold-up time (i.e. to keep the dc voltage for a short period of time when the input power source fails.) Power electronic circuits that use active switches usually need a dc power supply for the gate drive circuits that provide switching signals for the active electronic switches. Therefore, it would be useful if a passive electronic ballast circuit can be developed for providing a stable current source for the LED load. A passive ballast circuit without active switches, electronic control board and electrolytic capacitors would be a highly robust and reliable solution that enhances the lifetime of the entire LED system. The remaining challenge is to determine how to provide a stable current source for the LED load based on a totally passive circuit.

SUMMARY OF THE INVENTION

According to the present invention there is provided an LED lighting system comprising in sequence: (a) a rectification circuit for rectifying an AC input power and generating a rectified DC power, (b) a first circuit for reducing the voltage ripple of said rectified DC power, (c) a second circuit having a coupled inductor with a capacitor, the second circuit being arranged to generate a current source, and (d) at least one LED receiving said current source as an input, the power supplied to the at least one LED being permitted to vary, and the operating and/or design parameters of the at least one LED being chosen such that the variation in luminous flux resulting from the variation in power is not observable to the human eye.

Preferably the voltage ripple reducing circuit is a valley-fill circuit located between the rectification circuit and the inductor. The valley-fill circuit may include a voltage-doubler.

Preferably, the valley-fill circuit includes a first capacitor and a second capacitor. The capacitances of the first and second capacitors may be the same, or the first and second capacitors may have different capacitances such that the voltage ripple of said rectified DC power is further reduced.

Preferably the second circuit comprises an inductor. The second circuit may further function as a current ripple reduction circuit. Such a current ripple reduction circuit may comprise a coupled inductor with a capacitor.

Preferably means are also provided for reducing the sensitivity of the LED power to fluctuations in the AC input supply. This may be achieved, for example, by placing an inductor in series between the AC input supply and the diode rectification circuit. A capacitor may also be provided in parallel between this input inductor and the diode rectification circuit.

This input inductor may be a variable inductor that is controllable such that the at least one LED is dimmable. The use of a variable inductor may solely be for providing a dimming function, or may be for reducing the sensitivity of the LED power to fluctuations in the AC input supply in combination with providing a dimming function.

Such use of an input inductor may also be useful independently of providing reduction of voltage/current ripple and therefore according to another aspect of the invention there is also provided an LED lighting system comprising: an AC input power source, a rectification circuit for rectifying an AC input power and generating a rectified DC power, and an inductor provided in series between the AC input power source and the rectification circuit. Again, a capacitor may be provided in parallel between the inductor and the diode rectification circuit, the inductor being a variable inductor controllable such that the LED lighting system is dimmable. Also, the input inductor may be a variable conductor that is controllable so that the LED lighting system is dimmable.

In preferred embodiments of the invention the power supplied to the at least one LED is permitted to vary, and the operating and/or design parameters of the at least one LED are chosen such that the variation in luminous flux resulting from the variation in power is not observable to the human eye.

Viewed from another broad aspect the present invention provides a method of operating a LED lighting system comprising the steps of: (a) rectifying an AC input voltage to generate a rectified DC power, (b) reducing the voltage ripple of the rectified DC power, (c) generating a current source from the voltage ripple reduced rectified DC power, and (d) providing the current source as an input to at least one LED, wherein the power supplied to the at least one LED is permitted to vary by use of a variable inductor, and wherein the operating and/or design parameters of the at least one LED are chosen such that the variation in luminous flux resulting from the variation in power is not observable to the human eye.

Preferably a thermal characteristic of the at least one LED may be chosen such that the variation in luminous flux resulting from the variation in power is not observable to the human eye. Such a thermal characteristic may comprises the design of the heatsink and/or the provision of forced cooling or natural cooling.

Preferably a valley-fill circuit is used to reduce the voltage ripple of the rectified DC power. The valley-fill circuit may include a voltage-doubler.

Preferably, the valley-fill circuit is provided with a first capacitor and a second capacitor. The capacitances of the first and second capacitors may be the same, or the first capacitor may be selected with a different capacitance to the second capacitor such that the valley-fill circuit is used to further reduce the voltage ripple of the rectified DC power.

In preferred embodiments of the invention the method further comprises the step of reducing the current ripple of said current source. Such a circuit may comprise a coupled inductor with a capacitor used to reduce the current ripple.

Preferably the sensitivity of the LED power to fluctuations in the AC input supply voltage is also controlled.

Preferably, the AC input voltage can be varied so that the LED lighting system is dimmable.

The valley-fill circuit described above can be used more generally to generate a DC output voltage for broader variety of applications. Therefore, in another broad aspect of the present invention, there is provided a valley-fill circuit for generating a DC output voltage, the circuit including a first capacitor and a second capacitor, wherein the first and second capacitors have different capacitances such that the voltage ripple of the DC output voltage is reduced, and a current source circuit having an inductor.

A further broad aspect of the present invention provides a method of generating a DC output by using a valley-fill circuit including a first capacitor and a second capacitor, wherein the first and second capacitors have different capacitances such that a DC output voltage with reduced voltage ripple is generated.

BRIEF DESCRIPTION OF THE DRAWINGS

Some embodiments of the invention will now be described by way of example and with reference to the accompanying drawings, in which:

FIG. 28(*b*) is a graph showing the output voltage of the circuit of FIG. 18 in which C1=C2=22 μF;

DETAILED DESCRIPTION OF PREFERRED EMBODIMENTS

One important aspect of this invention at least in its preferred forms is to provide a way to reduce the size of the capacitors that is needed so that capacitors other than the electrolytic type can be used. With electrolytic capacitors eliminated in the lighting system, the whole system can be more reliable and last longer.

Figure 1:
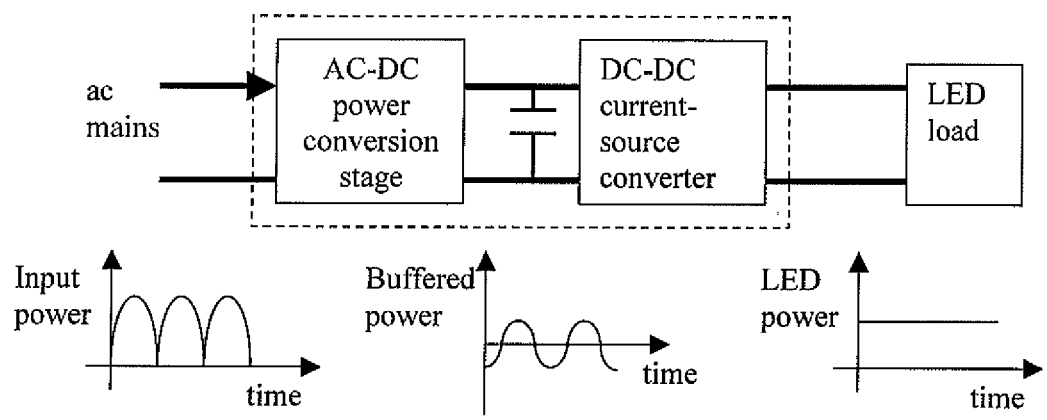
FIG. 1 shows a schematic and power profiles of a typical off-line LED lighting system according to the prior art.
Figure 2:
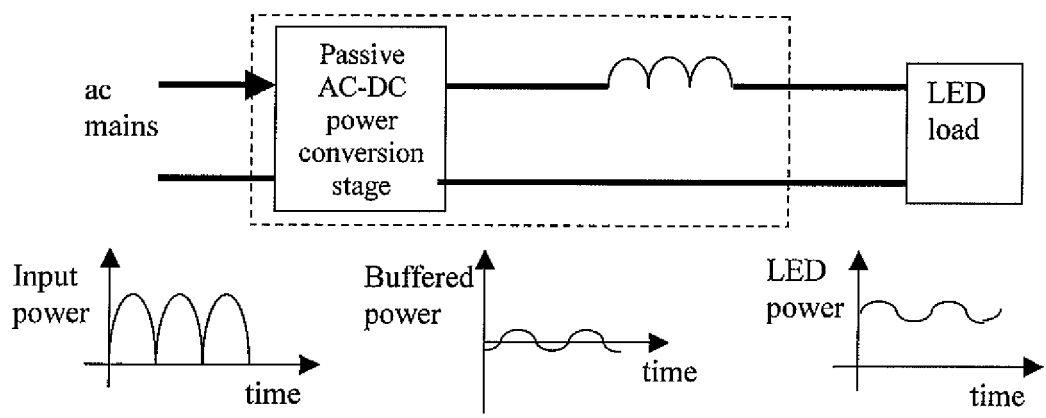
FIG. 2 shows a schematic and "modified" power profiles of an off-line LED lighting system according to an embodiment of the invention.

FIG. 2 is a modified version of FIG. 1 and is used to illustrate this aspect of the invention. If the LED load power is allowed to fluctuate to some extent, the amount of energy buffer required in the energy-storage element of the system becomes less and therefore the size of the capacitance can be reduced to a level that other non-electrolytic capacitors can be used to replace the electrolytic capacitor. Furthermore as the circuit contains only passive components rather than active components complicated control circuitry (which may also require electrolytic capacitors) can be avoided.

In addition to the elimination of electrolytic capacitors, the design is also concerned with the input power factor because there is an international standard IEC-61000 governing the input power factor. Passive power correction circuits such as valley-fill circuits and their variants [K. Kit Sum, "Improved Valley-Fill Passive Current Shaper", Power System World 1997, p. 1-8; Lam, J.; Praveen, K.; "A New Passive Valley Fill Dimming Electronic Ballast with Extended Line Current Conduction Angle", INTELEC '06. 28th Annual International Telecommunications Energy Conference, 2006. 10-14 Sep. 2006 Page(s): 1-7] can be used in the passive ballast circuit in embodiments of this invention.

Valley-fill circuits allow the input current to be smoothed so that the current distortion factor and thus the input power factor can be improved. The choice of the capacitors used in the valley-fill circuit can be made so that non-electrolytic capacitors can be used. Unlike previous applications, the valley-fill circuit is used in embodiments of this invention to reduce the output voltage ripple which in turn will reduce the current ripple in the later power stage. This aspect of the valley-fill circuit application has not been reported previously because in the prior art valley-fill circuits were primarily used for voltage source applications and were used as a means for input power factor correction with their outputs are nominally connected directly to another power converter or a load. For example, in the National Semiconductor Note: LM3445 Triac Dimmable Offline LED Driver March 2009, the two capacitors C7 and C9 in the valley-fill circuit are electrolytic capacitors and the valley-fill circuit provides a "voltage source" to a buck converter which in turn controls the power of the LED load. Such example of valley-fill circuit application highlights the traditional use of "electrolytic capacitor" in absorbing large power variation and the voltage source nature of prior art.

Figure 17A:
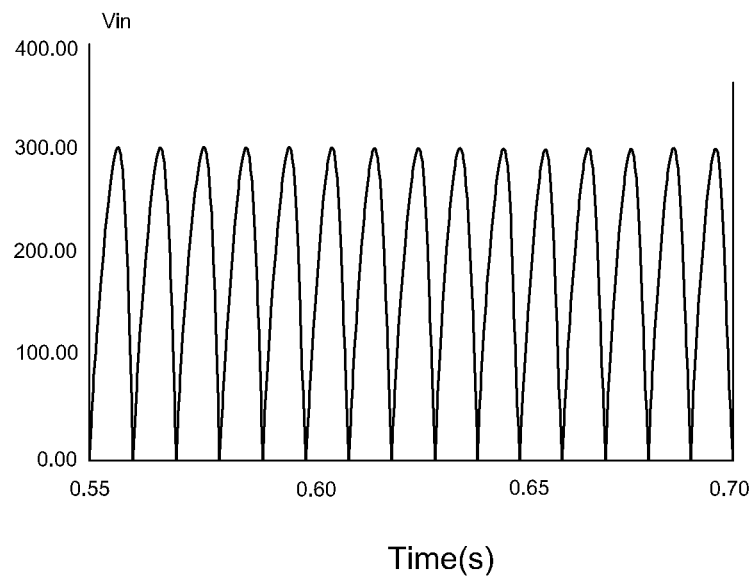
FIGS. 17(*a*) and (*b*) illustrate the use of the valley-fill circuit in reducing the voltage ripple.
Figure 17B:
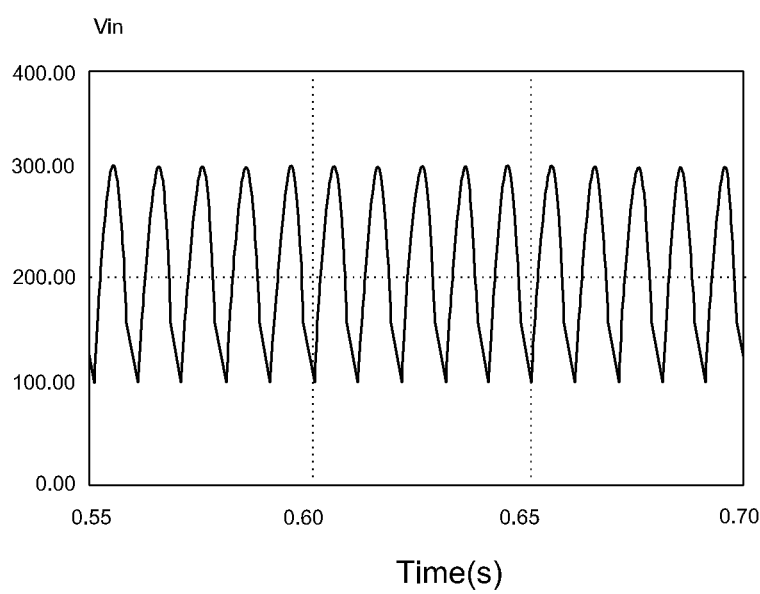

In contrast in embodiments of the present invention valley-fill circuits are used to reduce the output voltage ripple. As shown in FIG. 17(*a*), the output voltage of the diode rectifier has high voltage ripple. However, the output voltage of the valley-fill circuit is significantly reduced as shown in FIG. 17(*b*). In embodiments of this invention, the valley-fill circuit is not connected directly to the load or another power converter as in prior art, but is connected directly to an inductor or a coupled-inductor based current ripple cancellation circuit for providing a smooth current to the LED load.

In embodiments of the invention an inductor (FIG. 4(*a*)) or a coupled inductor with ripple cancellation (FIG. 4(*b*)) may be used to limit the output current ripple and hence the power variation for the LED load.

FIG. 4(*a*) and FIG. 4(*b*) show schematic diagrams of passive circuits according to embodiments of the invention that can provide high reliability, long lifetime and low cost. Each system consists of a diode rectifier, a valley-fill circuit for improving the input power factor, an inductor for turning the voltage source into a current source with reduced current ripple (FIG. 4(*a*)) and the LED load. An alternative embodiment as shown in FIG. 4(*b*) is to replace the inductor in FIG. 4(*a*) with a coupled inductor and a capacitor so that these components form a coupled inductor with current ripple cancellation function. It will be shown that such current ripple cancellation which is commonly used in high-frequency (greater than 20 kHz) switching power supplies can also be effective in low-frequency operation. The LED load could be an LED array or multiple arrays in modular forms. Various valley-fill circuits or their improved versions can be used to improve the input power factor. In embodiments of this invention, non-electrolytic capacitors can be used in the valley-fill circuit and current-ripple cancellation circuit. Either a standard valley-fill circuit, a valley-fill circuit with voltage doubler or any variant of the valley-fill circuit can be used in this invention.

Figure 4A:
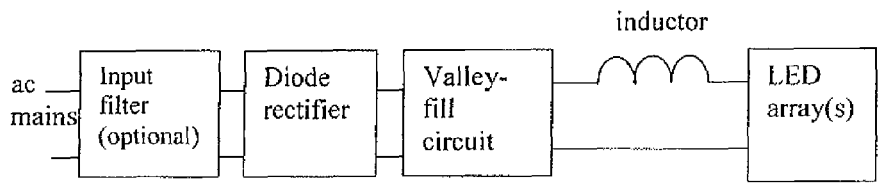
FIGS. 4(a), (b) and (c) show (a) a schematic diagram of a passive off-line circuit design for an LED system using an inductor for current ripple reduction, and (b) and (c) using a coupled inductor for current ripple reduction.

Considering firstly FIG. 4(a), let the output voltage of the valley-fill circuit be $V_{out}$ and the overall voltage of the LED module (with LED devices connected in series) be $V_{LED}$. The inductance of the inductor can be designed to limit the current through the LED module because the current ripple $\Delta I_{LED}$ can be expressed as:

$$\Delta I_{LED} = \frac{(V_{out} - V_{LED})\Delta t}{L}$$

where $\Delta t$ is the time period during the current change.

From the above equation, it can be seen that the size of the inductor L can be used to reduce the current ripple, which in turn can limit the change of total LED power because $$\Delta P_{LED} = V_{LED} \Delta I_{LED}$$

Figure 4B:
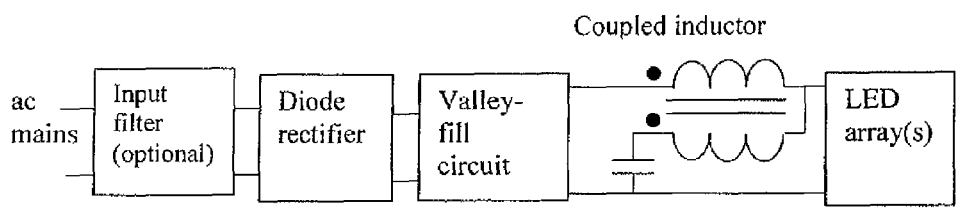
Figure 4C:
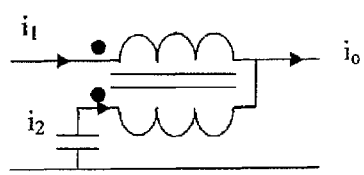
Figure 4C:
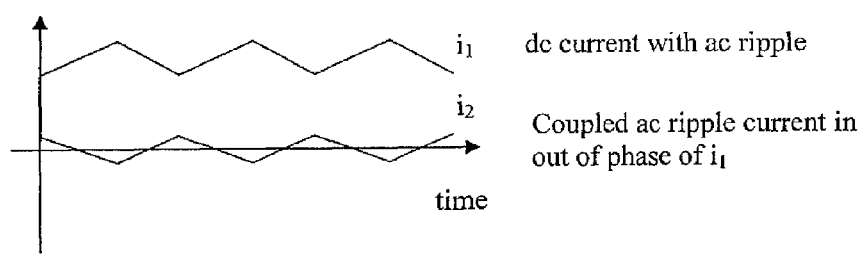
Figure 4C:
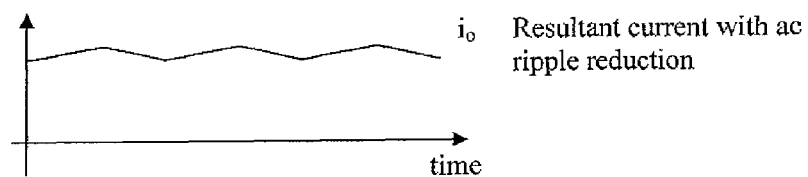

An alternative shown in FIG. 4(b) is to use a coupled inductor with current ripple cancellation as described in the art [Hamill, D. C.; Krein, P. T.; "A 'zero' ripple technique applicable to any DC converter", 30th Annual IEEE Power Electronics Specialists Conference, 1999. PESC 99. Volume 2, 27 Jun.-1 Jul. 1999 Page(s): 1165-1171; Schutten, M. J.; Steigerwald, R. L.; Sabate, J. A.; "Ripple current cancellation circuit" Eighteenth Annual IEEE Applied Power Electronics Conference and Exposition, 2003. APEC '03. Volume 1, 9-13 Feb. 2003 Page(s): 464-470; Cheng, D. K. W.; Liu, X. C.; Lee, Y. S.; "A new improved boost converter with ripple free input current using coupled inductors", Seventh International Conference on Power Electronics and Variable Speed Drives, 1998. (Conf. Publ. No. 456) 21-23 Sep. 1998 Page(s): 592-599]. The primary winding of the coupled inductor is used as the dc inductor just as in the embodiment of FIG. 4(a). The secondary winding is coupled to the primary winding and provides the ac current to reduce the ripple in the load. When the primary current in the first inductor is increasing into the dotted terminal of the primary winding (i.e. changing positively), ac flux caused by the increasing primary current is coupled to the secondary ac winding. The transformer action causes a current to flow out of the dotted terminal of the secondary winding into a capacitor in order to cancel the ac flux. Thus, the overall current ripple in the output of the coupled inductor (including both primary and secondary windings) and the load is reduced. Similarly, when the primary current flowing into the dotted terminal of the primary winding is decreasing (i.e. changing negatively), the ac flux coupled to the secondary winding will cause a current to flow into the dotted terminal of the secondary winding and hence reduce the overall current ripple of the couple inductor. The effect of the coupled inductor on reducing the current ripple is illustrated in FIG. 4 (c).

Figure 3:
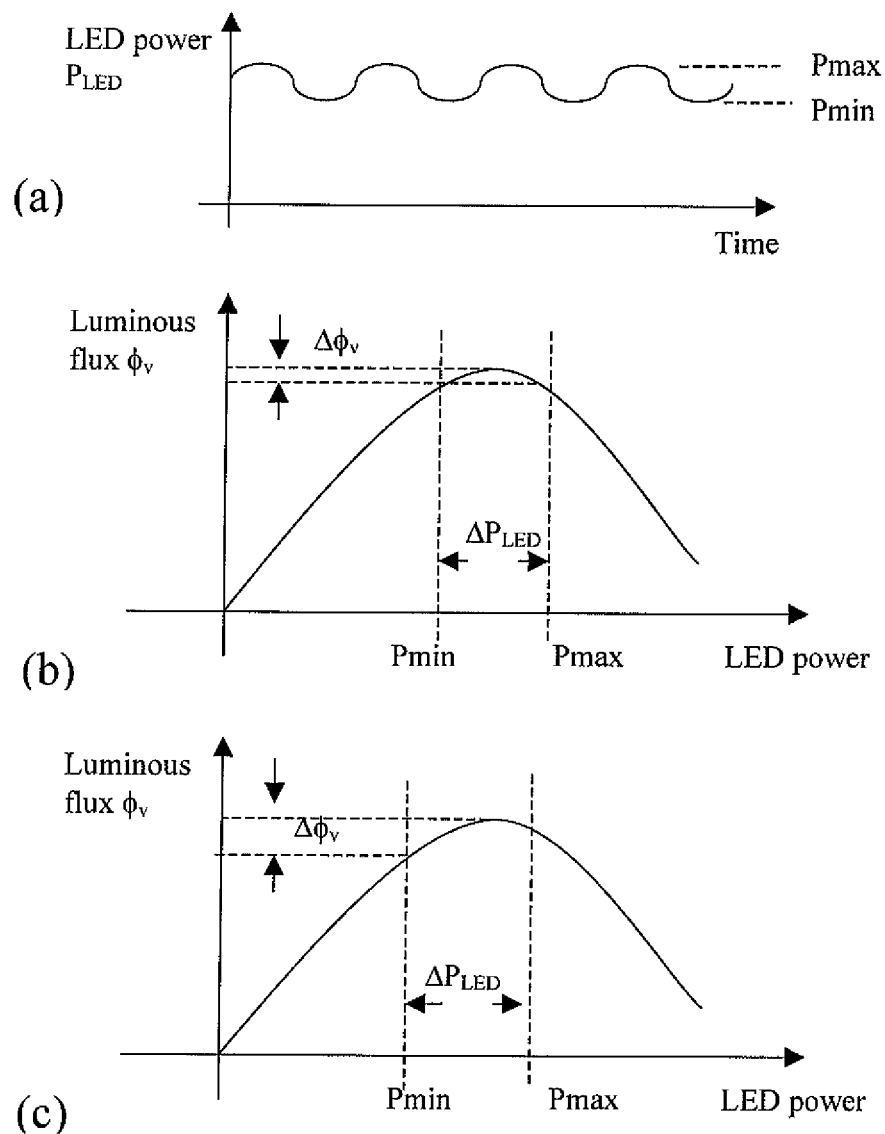
FIGS. 3(a)-(c) show the variation of LED power and luminous flux in an embodiment of the present invention.

In embodiments of the present invention there will be fluctuation of the LED load power, but it is possible to obtain luminous output from the LED system with minimum luminous flux fluctuation even though the LED load power will fluctuate. This can be seen by considering the relationship between the luminous flux $\phi_v$ and LED power $P_d$ as shown in FIGS. 3(a)-(c). Let us label the maximum power and minimum power of the LED load as Pmax and Pmin, respectively in FIG. 3(a). It has been shown that the relationship of the luminous flux and the power of a LED system follows an asymmetric parabolic curve as shown in FIG. 3(b) [Hui S. Y. R. and Qin Y. X., "General photo-electro-thermal theory for light-emitting diodes (LED) systems", IEEE Applied Power Electronics Conference, February 2009, Washington D.C., USA, paper 16.2; U.S. Ser. No. 12/370,101 the contents of which are incorporated herein by reference]. If the LED system is designed such that Pmax and Pmin enclose the peak region of the luminous flux—LED power curve where the slope of the curve is minimum as shown in FIG. 3(b), a significant variation of LED power ($\Delta P_{LED}$) will only lead to a relatively small variation in the luminous flux ($\Delta \phi_v$). An alternative is to design the LED thermal design so that $P_{max}$ and $P_{min}$ fall within a region of the luminous flux—LED power curve where the slope of the curve is relatively small (i.e. near the peak value) as shown in FIG. 3(c).

In this way, the control circuit can use non-electrolytic capacitors without causing a large variation in the light output of the LED system. This concept can be implemented in existing electronic ballasts by replacing the electrolytic capacitors with other capacitors of lower values and re-designing the LED system so that the LED power variation falls within the peak luminous flux region in the luminous flux—LED power curve.

Another important aspect of the present invention involves the use of novel passive power circuits that can achieve the advantages proposed above without using active electronic switches. Without using active electronics switches, the proposed circuits do not need an electronic control circuit for the switches and can be much more reliable, long-lasting and have lower costs than their active electronic counterparts.

Figure 5:
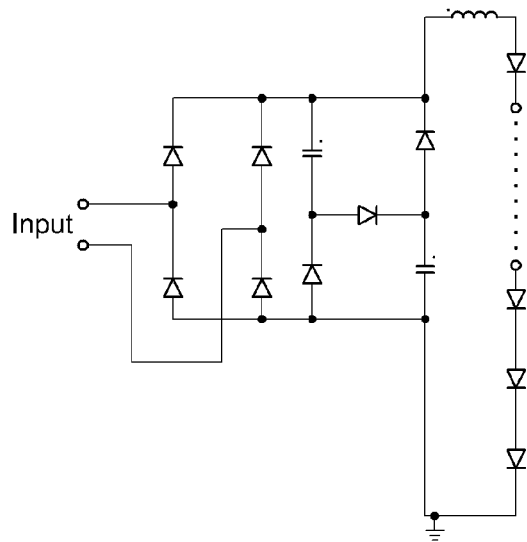
FIG. 5 shows a schematic of an example of one possible hardware implementation of the proposed passive circuit for an off-line LED system using a standard valley-fill circuit.
Figure 6:
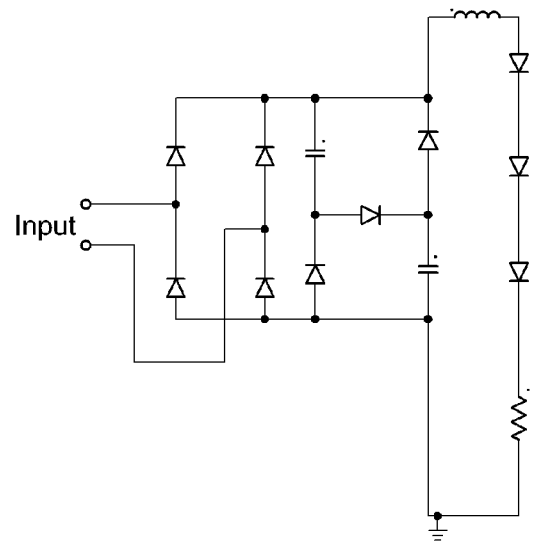
FIG. 6 shows a model used for simulation of the circuit in FIG. 5.
Figure 7:
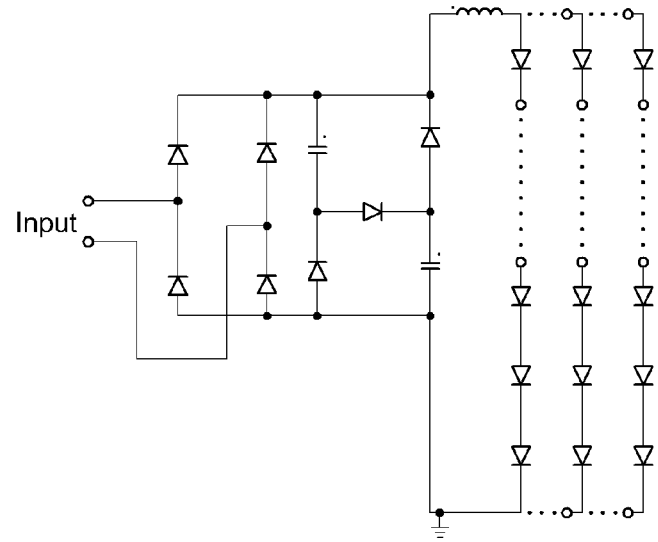
FIG. 7 shows an example of a proposed passive circuit with a standard valley-fill circuit for multiple loads.
Figure 8:
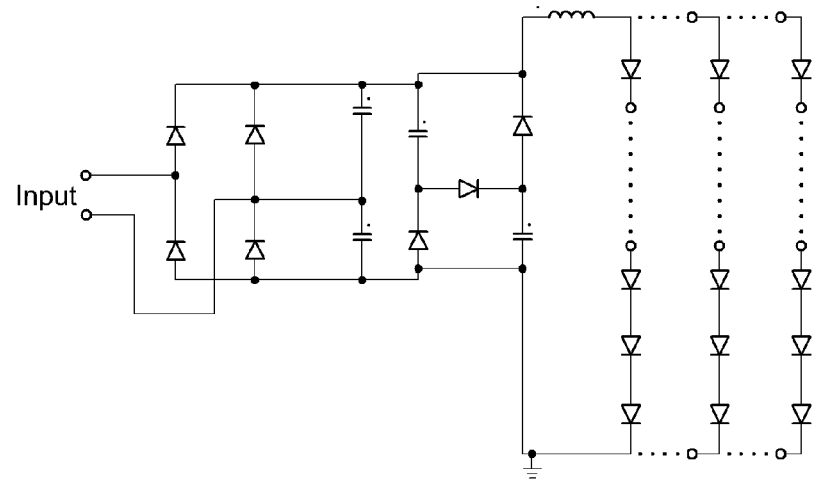
FIG. 8 shows an example of a proposed passive circuit using a valley-fill circuit with a voltage doubler for multiple loads.

FIG. 5 shows a circuit diagram based on a standard valley-fill circuit. In the actual simulation as shown in FIG. 6, a small number of LED devices are represented by individual diodes and a large number of the LED devices are represented by an equivalent resistor that has the same voltage drop and consumes the same power of that group of LED devices when the rated current flow through these series connected devices. A valley-fill circuit with a voltage doubler as shown in FIG. 8 can also be used if desired. If multiple LED modules are used as shown in FIG. 8, current-balancing devices can be added to ensure that each LED array module shares the same current.

Figure 9:
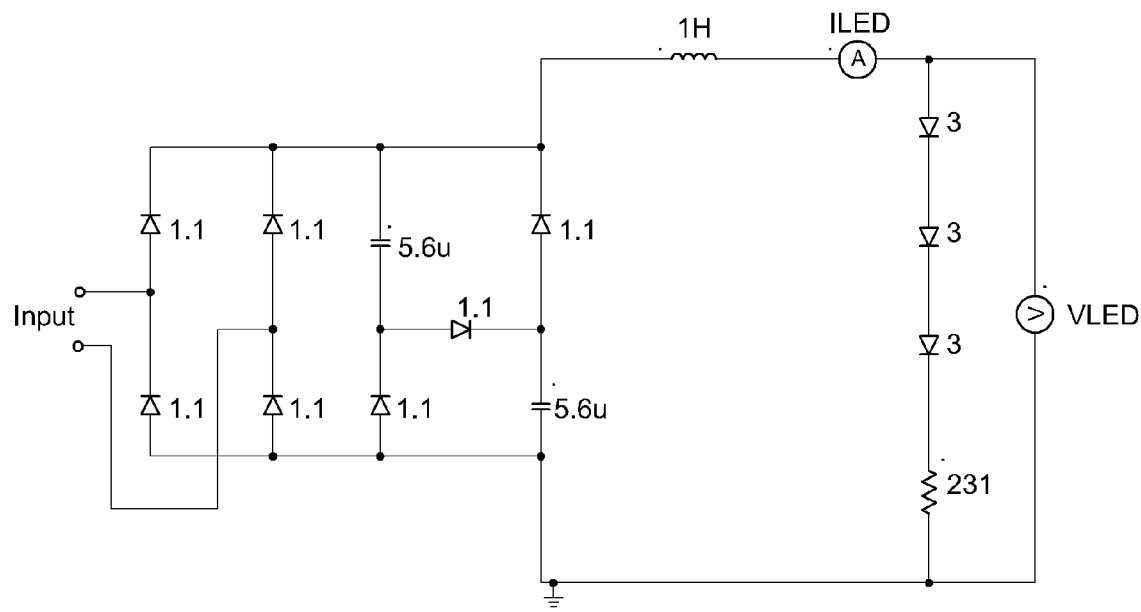
FIG. 9 shows an LED system according to an embodiment of the invention under a simulation evaluation (L=1H)
Figure 10A:
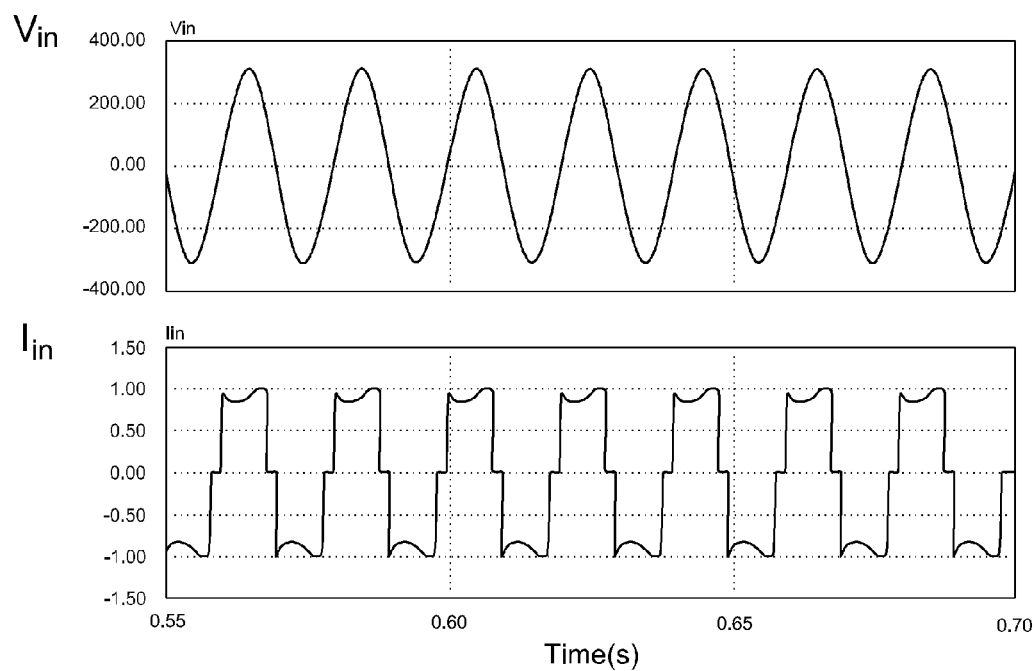
FIGS. 10(a) and (b) show (a) simulated input voltage and current of the system of FIG. 9, and (b) simulated input power of the system of FIG. 9.
Figure 10B:
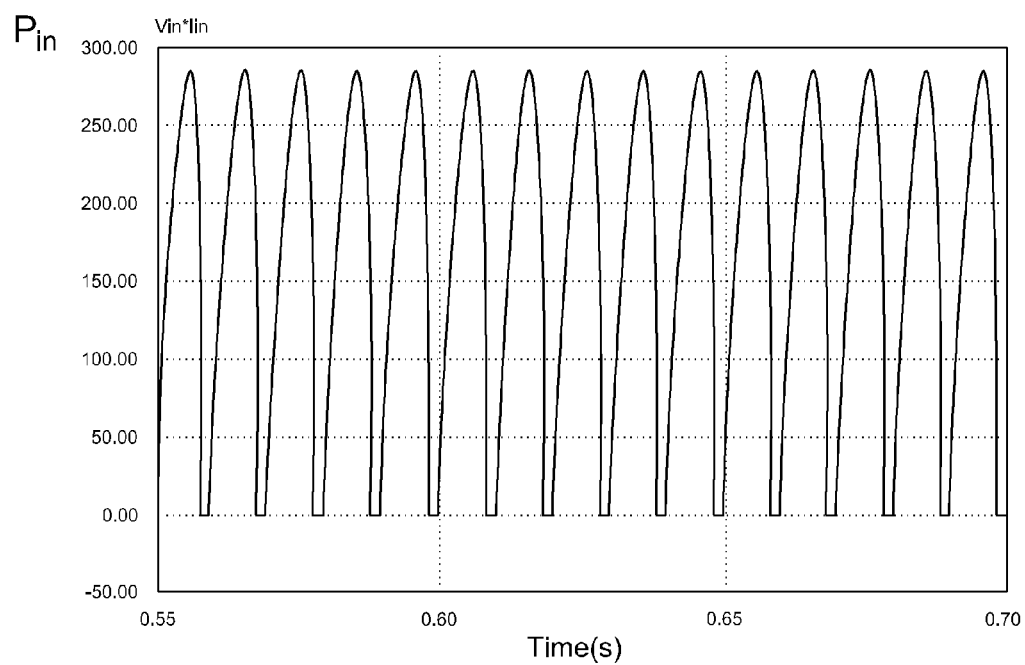
Figure 11A:
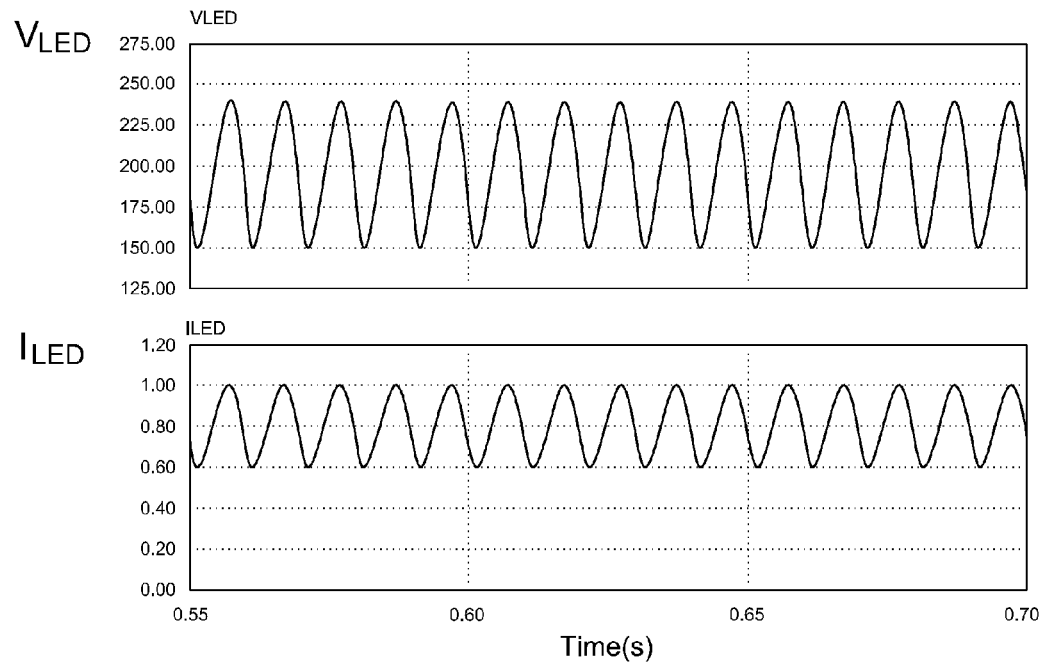
FIGS. 11(*a*)-(*d*) show (a) simulated voltage and current of the LED module for the circuit of FIG. 9, (b) simulated total power for the LED module and for individual LEDs in the module for the system in FIG. 9, (c) and (d) two examples of the relationship between a variation of LED power and luminous flux fluctuation for a LED system using 3 W LED devices.
Figure 11B:
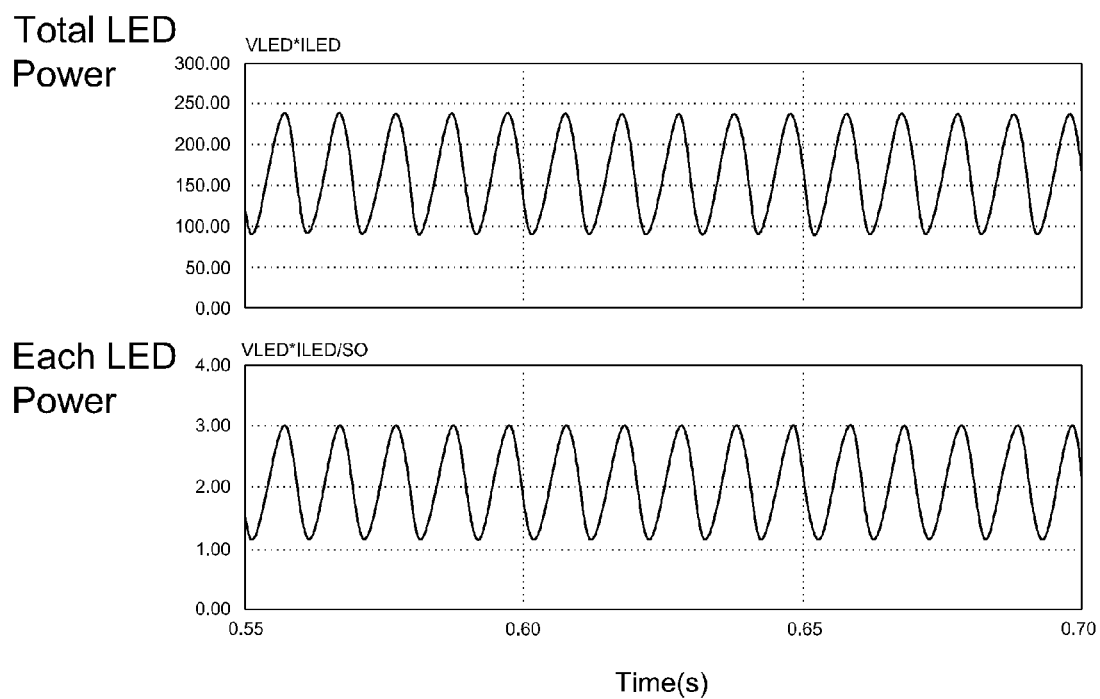
Figure 11C:
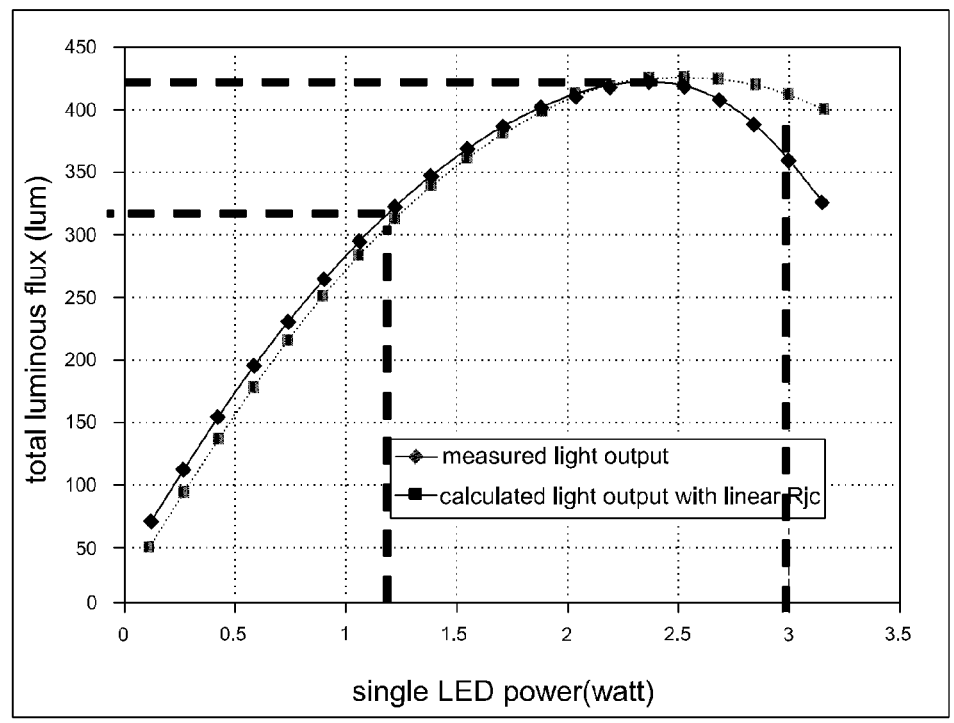
Figure 11D:
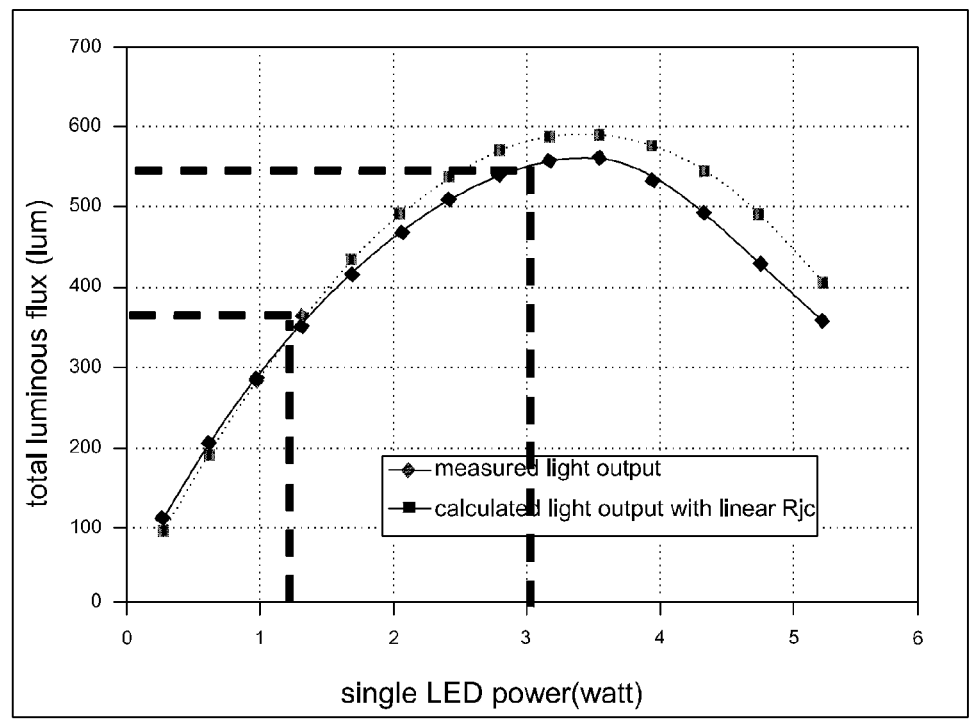

In order to illustrate this aspect of the present invention, the passive circuit of FIG. 9 is used to drive a series of 3 W LEDs. In the simulation, three diodes are used while the rest of the diodes are represented as an equivalent resistor as explained previously. FIG. 10(a) shows the simulated input voltage and current of the entire system. It can be seen that the input current waveform is not a sharp pulse (as would be expected from a diode bridge with an output capacitor) and the power factor has therefore been improved. FIG. 10(b) shows the input power of the system. FIG. 11(a) shows the simulated voltage and current of the LED module. The inductor is designed so that the LED rated current of 1 A (for the 3 W LED devices) is not exceeded in this example. Despite the pulsating input power, the reduction of the voltage fluctuation due to the use of the valley-fill circuit and the filtering effect of the inductor have smoothed the load current considerably. FIG. 11(b) shows the total LED power and individual LED power. It can be seen that the power variation is within 1.2 W to 3 W (i.e. 60%) in this example. This simulation study confirms that a passive circuit without electrolytic capacitors and active switches can be designed to provide a current source with controlled current ripple for a LED system with input power factor correction.

This per-unit result of LED power in FIG. 11 can be interpreted with typical LED systems with different thermal designs. For example, it has been shown that the luminous flux—LED power curves depend on the thermal resistance of the heatsinks. FIG. 11(c) and FIG. 11(d) show typical curves for LED systems using two different heatsinks for eight 3 W LEDs. The heatsink used for FIG. 11(c) is smaller than that for FIG. 11(d). For the example in FIG. 11(c), a 60% variation from 1.2 W to 3 W for each device will lead to about 24% of light variation. For the example of FIG. 11(d), a 60% variation of LED power leads to 30% of light variation.

However, it is important to note that the choice of inductance of the inductor can control the current ripple and therefore the LED power variation. If the inductance L is increased from 1H to 2H (FIG. 12), the simulated LED voltage and current waveforms are plotted in FIG. 13(a). The corresponding total LED power and individual LED power are included in FIG. 13(b).

Figure 13A:
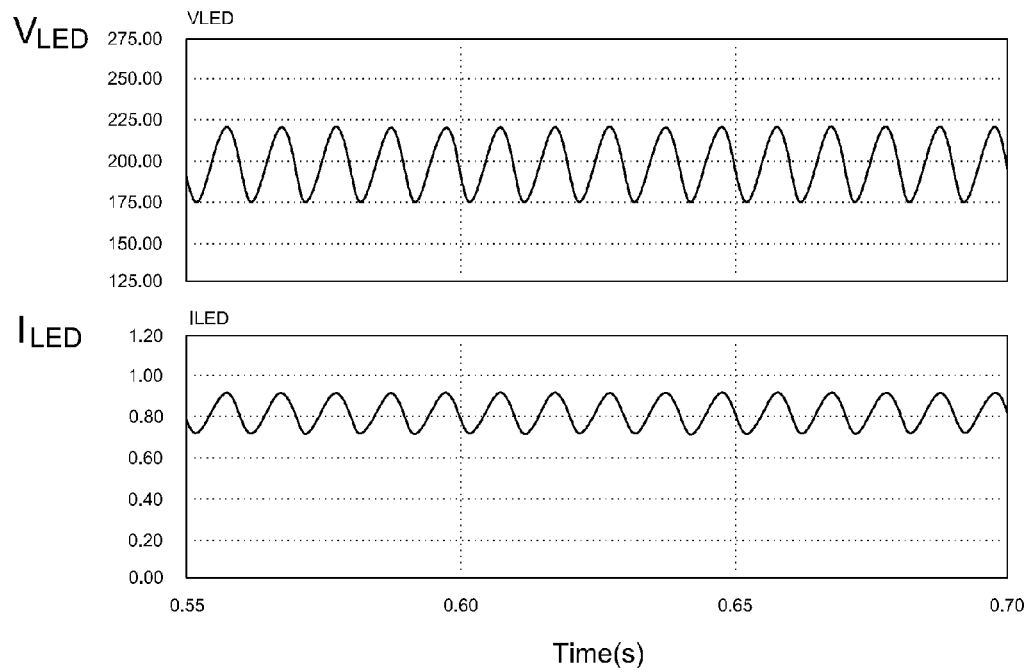
FIGS. 13(*a*)-(*d*) show (a) simulated input voltage and current of the system of FIG. 12, (b) simulated input power of the system of FIG. 12, (c) and (d) two examples of the relationship between a variation of LED power and luminous flux fluctuation for a LED system using 3 W LED devices.
Figure 13B:
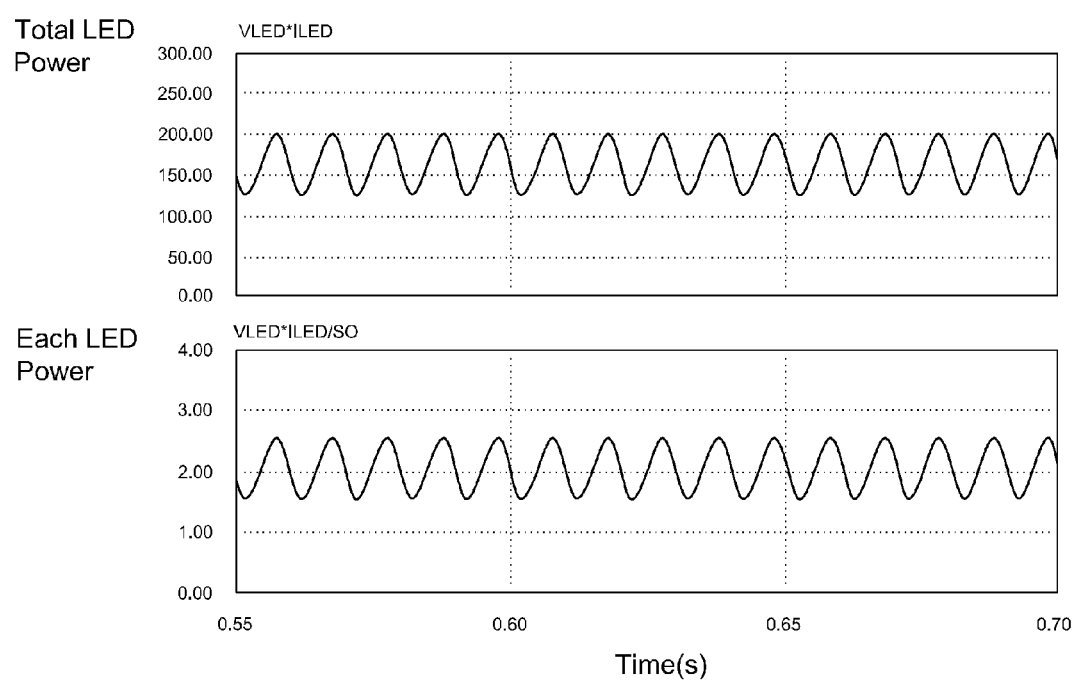
Figure 13C:
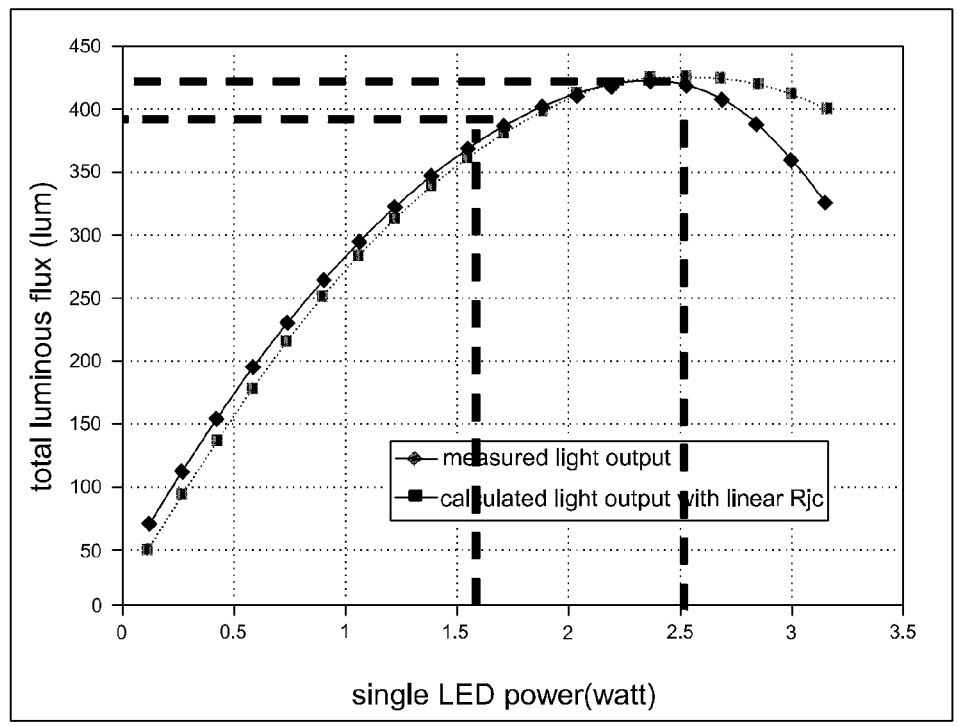
Figure 13D:
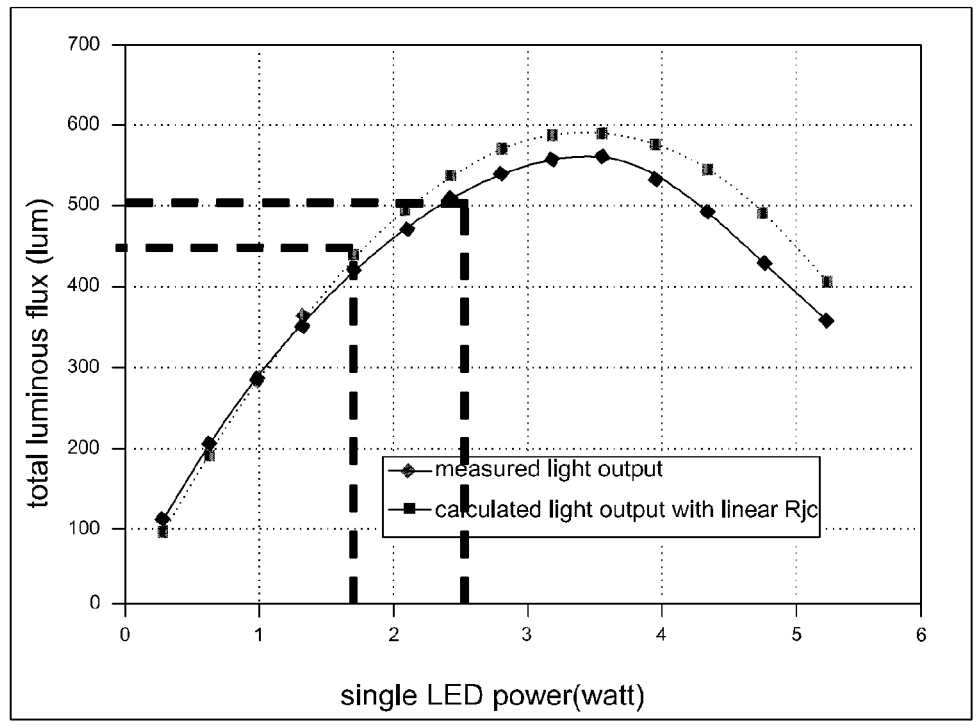

It can be seen that, with L increased to 2H, the power variation (from 1.6 W to 2.5 W) is 36%. If the same power variation is applied to the two examples in reference Hui et al [Hui S. Y. R. and Qin Y. X., "General photo-electro-thermal theory for light-emitting diodes (LED) systems", IEEE Applied Power Electronics Conference, February 2009, Washington D.C., USA, paper 16.2], FIG. 13(c) and FIG. 13(d) show that the variation in the luminous flux is approximately 7% and 12%, respectively. It is envisaged that human eyes are not sensitive to such small changes of luminous flux variation.

It can be seen that a large inductance can reduce the current ripple and LED power variation. The choice of L depends also on the core loss and copper loss in the inductor. The overall design therefore relies on the thermal design as explained in Hui et al and the choice of L so that the operating range can be restricted to the region of the luminous flux—LED power curve where the slope of the curve is small.

Figure 12:
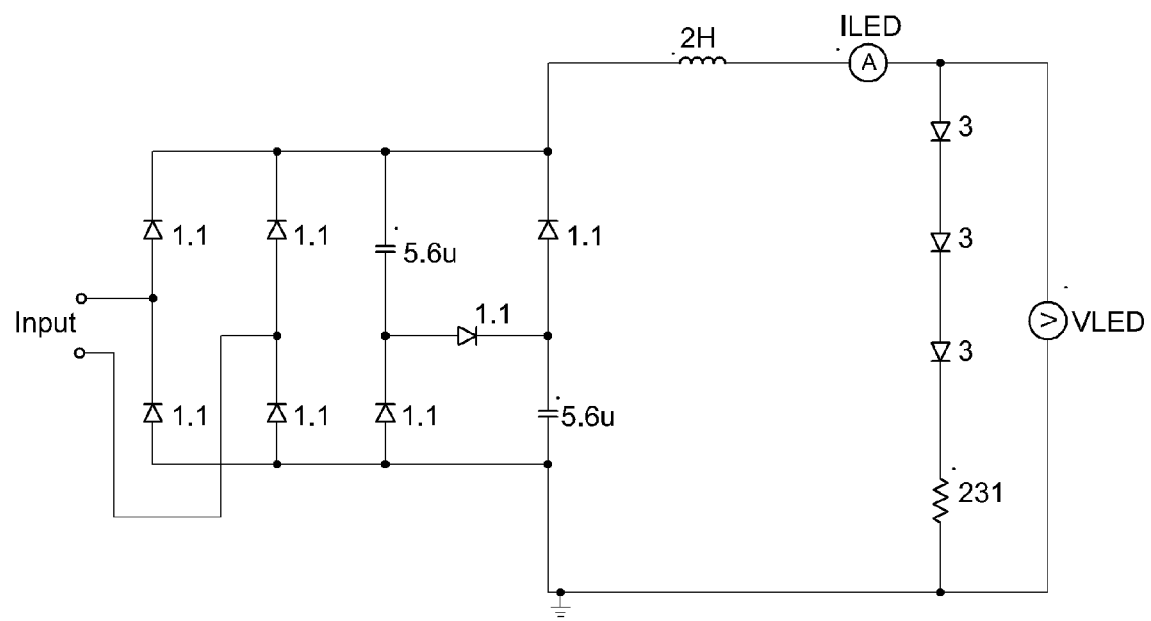
FIG. 12 shows an LED system according to an embodiment of the invention under a simulation evaluation (L=2H)
Figure 14:
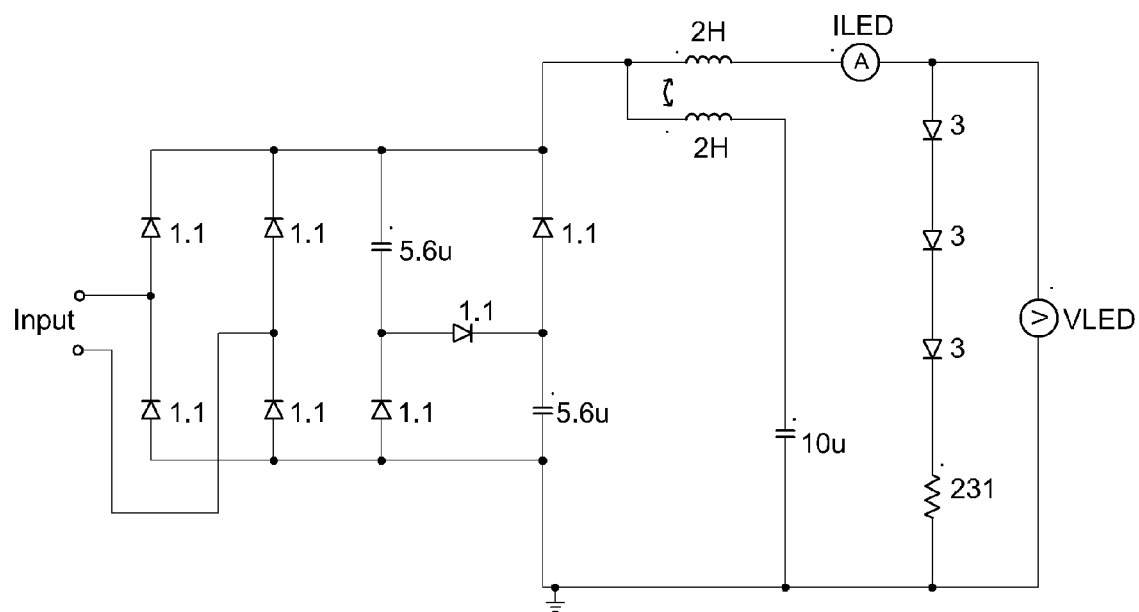
FIG. 14 shows an embodiment of a LED system with "coupled inductor" of L=2H under simulation evaluation (L=2H)
Figure 15A:
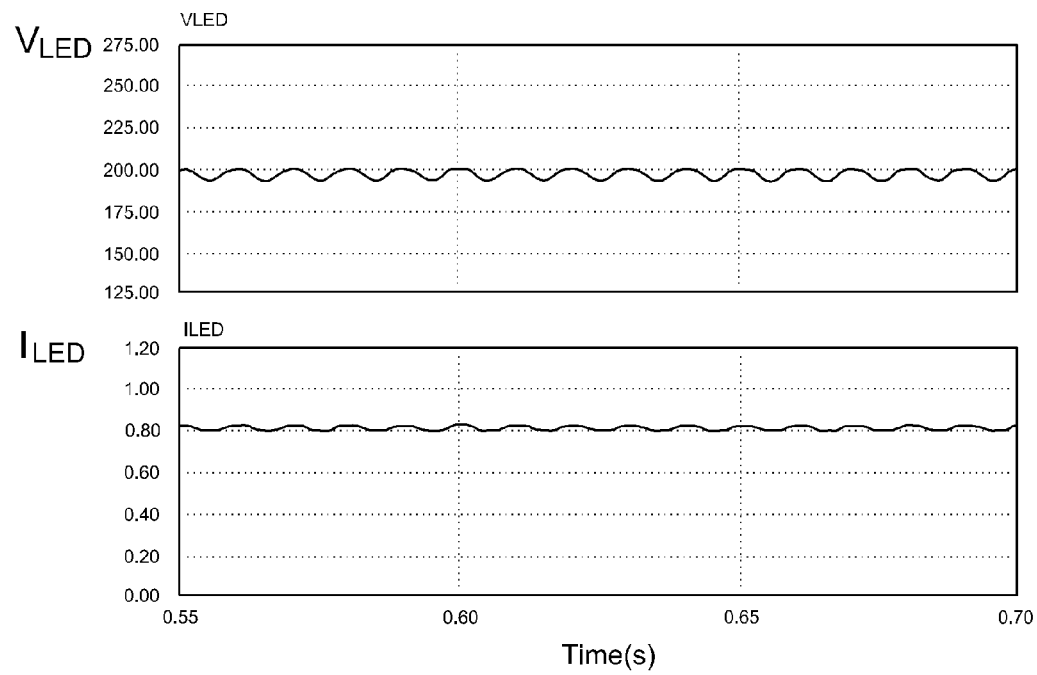
FIGS. 15(*a*)-(*d*) show (a) simulated input voltage and current of the system of FIG. 14, (b) simulated input power of the system of FIG. 14, (c) and (d) two examples of the relationship between a variation of LED power and luminous flux fluctuation for a LED system using 3 W LED devices.
Figure 15B:
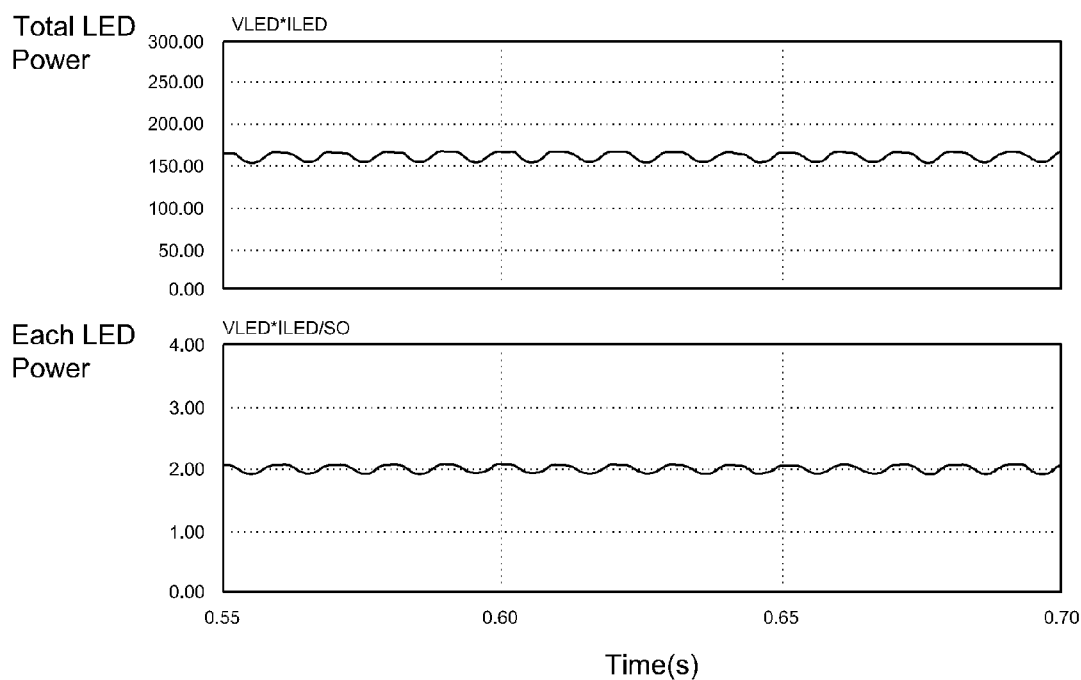
Figure 15C:
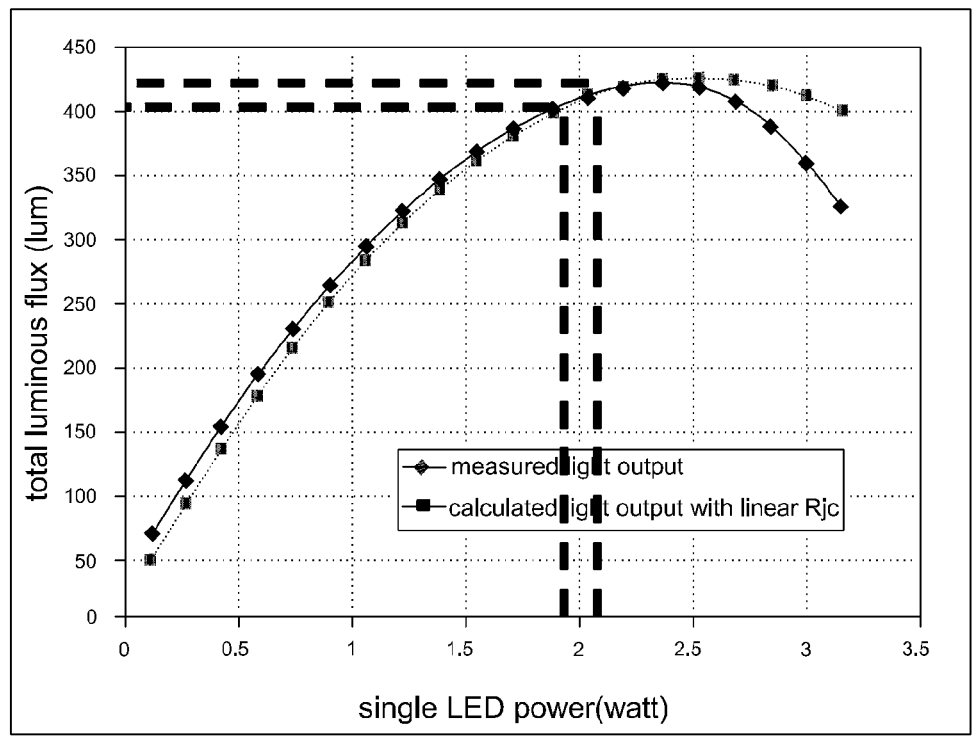
Figure 15D:
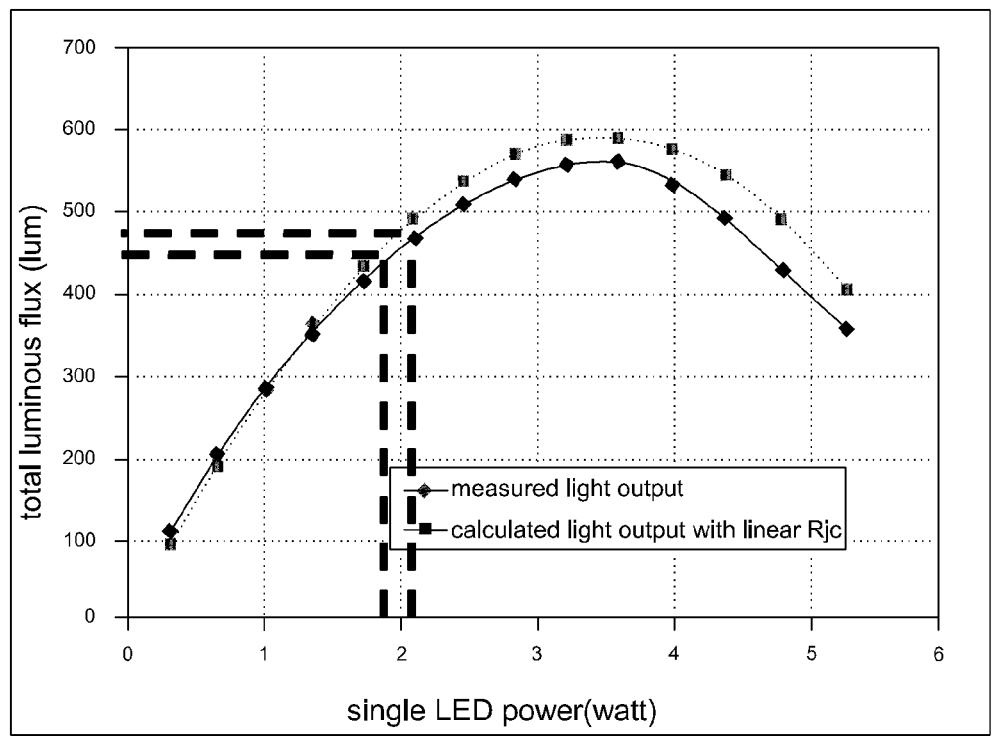

An effective method to further reduce the current ripple and thus LED power variation and light variation is to replace the inductor in FIG. 9 and FIG. 12 with a current-ripple cancellation means in the form of a coupled inductor and a capacitor as shown in FIG. 14. FIG. 15(a) and FIG. 15(b) show the electrical measurements of the system. It can be seen the variations in the LED current ripple and power have been greatly reduced. The power variation is only within 0.2 W (from 1.9 W to 2.1 W). This 9% power variation will lead to less than 4% of light variation in the two examples as shown in FIG. 15(c) and FIG. 15(d).

Figure 16:
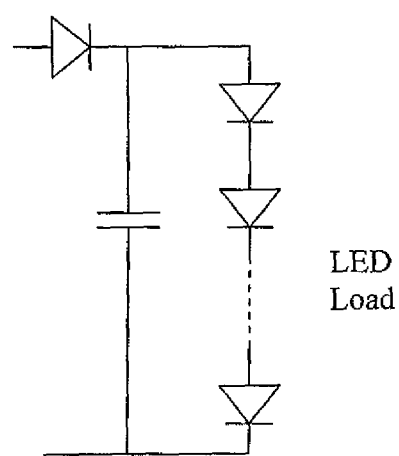
FIG. 16 shows a diode-clamp that may be added to each LED string in embodiments of the invention.

It should also be noted that it may be desirable to provide a diode-capacitor clamp that can be added to each LED string to provide a current path for the inductor current in case some of the LED devices fail. An example of such a possibility is shown in FIG. 16.

From the above it will be seen that in preferred embodiments of the present invention there is proposed the use of a passive power correction circuit such as the valley-fill circuit to reduce the voltage ripple feeding the inductor (or coupled inductor with a capacitor in the form of current ripple cancellation circuit) and the LED modules in order to (i) reduce the current ripple and thus the power variation in the LEDs and (ii) to improve the input power factor. The allowance of some current and power variation in the LEDs within the region of the luminous flux—LED power curve where the slope of the curve is small will lead to only a small variation of the luminous flux from the LED system. The use of the inductance of the inductor or coupled inductor in the form of a current ripple cancellation circuit to further limit the power variation of the LED system.

By using a suitable thermal design the power variation range of the LED load can be designed to fall within the region of the luminous flux—LED power curve where the slope is small and the luminous flux is maximum or near maximum.

As a consequence of the requirement of only small capacitance in the proposed system, electrolytic capacitors can be eliminated from this design. Since the entire circuit consists of passive and robust components (such as power diodes, non-electrolytic capacitors and inductors) only and does not need extra control electronics, it features low-cost, high robustness and reliability.

One possible issue, however, is that the abovedescribed circuits assume a reasonably constant input voltage which may not necessarily be true. In countries where the AC mains supply is unreliable or in any other situation where there may be AC mains voltage fluctuation for whatever reason, there could be a significant variation in the LED power for a given nominal AC input voltage. In preferred embodiments of the invention therefore it may be preferable to provide a means for controlling the power sensitivity of the load against AC voltage fluctuation.

Figure 18:
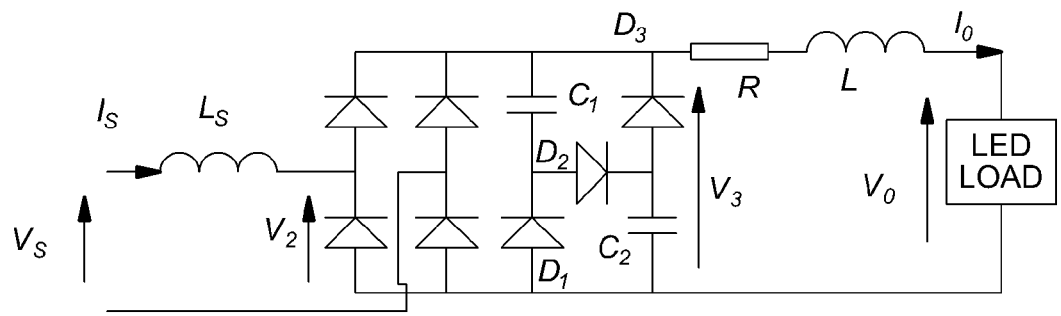
FIG. 18 shows a circuit according to a further embodiment of the invention.

FIG. 18 shows one example of a circuit provided with means for controlling the power sensitivity of the load against AC voltage fluctuation. In this example a passive ballast for an LED system is shown provided with a diode rectifier, a valley-fill circuit for reducing the voltage ripple of the rectified DC power, and a filter inductor L for generating a current source provided to the LED load. It will be understood that as described above the inductor L could instead by replaced by a current ripple reduction circuit comprising a coupled inductor with a capacitor. In this circuit an input inductor $L_s$ is provided in series between the AC supply $V_S$ and the diode rectifier which as will be explained below provides the necessary power sensitivity control.

Figure 19A:
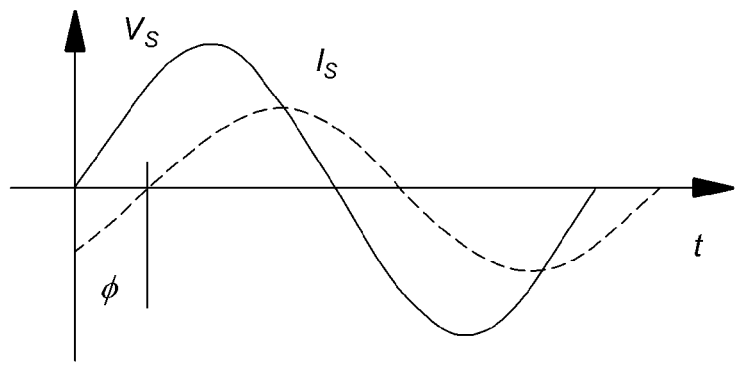
FIGS. 19(*a*)-(*d*) show idealized waveforms in the circuit of FIG. 18.
Figure 19B:
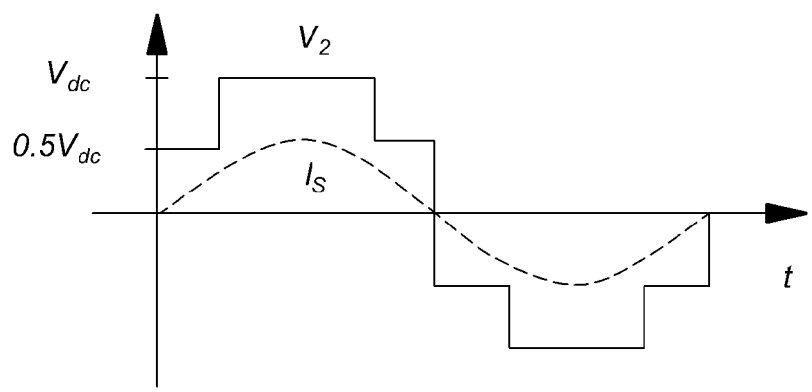
Figure 19C:
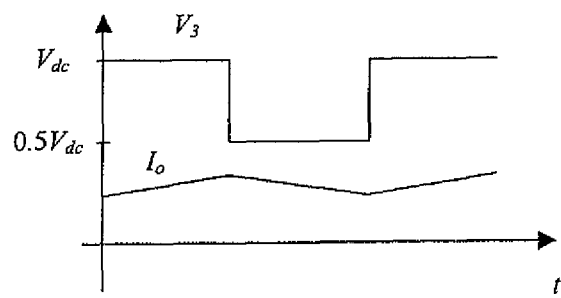
Figure 19D:
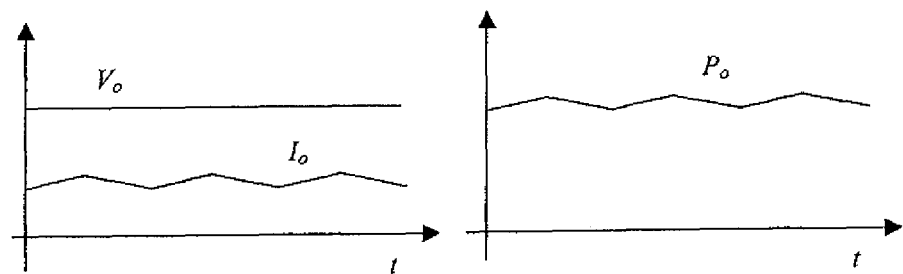

FIGS. 19(a)-(d) show the idealized waveforms of the proposed AC-DC current source circuit for LED loads. In particular: FIG. 19(a) shows idealized waveforms of input AC mains voltage and current (with a phase shift ($\phi$) between $V_s$ and $I_s$); FIG. 19(b) shows idealized waveforms of input voltage $V_2$ and current $I_s$ of the diode rectifier (with $V_2$ and $I_s$ in phase); FIG. 19(c) shows idealized waveforms of output voltage $V_3$ and current $I_o$ of the valley-fill circuit (with $V_3$ a rectified version of $V_2$); and FIG. 19(d) shows idealized waveforms of voltage across LED load ($V_o$), output load current ($I_o$) and the output load power ($P_o$).

Figure 20:
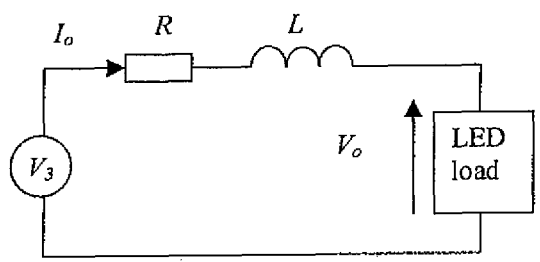
FIG. 20 shows a simplified equivalent circuit of FIG. 18.

An analysis of this circuit can start from the load side by considering the equivalent circuit as shown in FIG. 20 where the inductor winding resistance is shown as R and the total LED load voltage drop $V_0$ is considered to be constant.

From FIG. 20, the average output current $\bar{I}_o$ can be expressed as:

$$\bar{I}_o = \frac{\bar{V}_3 - V_o}{R} \tag{1}$$

where $\bar{V}_3$ is the average voltage of $V_3$.

From the waveform of $V_3$ in FIG. 19(c), $$\bar{V}_3 = \frac{3}{4}V_{dc} \tag{2}$$

-continued $$V_{dc} = \frac{4}{3}\overline{V}_3 = \frac{4}{3}(V_o + \overline{I}_o R) \quad (3)$$

It should be noted that the total voltage drop of the LED load is approximated as a constant $V_o$. Therefore, $V_{dc}$ does not change significantly if $\overline{I}_o$ does not change significantly. In general, $V_o$ is much bigger than $\overline{I}_o R$. Thus $V_{dc}$ is close to 1.33 $V_o$. The next issue is to find out a way to reduce the change of $\overline{I}_o$ due to fluctuation in the input mains voltage.

By the law of conservation of energy, input power is equal to the power entering the diode bridge, assuming that the input inductor $L_s$ has negligible resistance. Also and note that $V_{21}$ and $I_S$ are in phase as shown in FIG. 19(*b*).

$$V_S I_S \cos\phi = V_{21} I_S \quad (4)$$

where $V_{21}$ is the fundamental component of $V_2$.

Similarly, the input power is also equal to the output power of the valley-fill circuit, assuming that the power loss in the diode rectifier and valley-fill circuit is negligible.

$$V_S I_S \cos\phi = \overline{V}_3 \overline{I}_o = \frac{3}{4} V_{dc} \overline{I}_o = \overline{I}_o^2 R + \overline{I}_o V_o \quad (5)$$

If the inductor winding resistance is negligible, R=0, leading to $$V_o = \frac{3}{4} V_{dc} \quad (6)$$

Using Fourier analysis on the waveform of $V_2$, the fundamental component $V_{21}$ of $V_2$ can be determined as:

$$V_{21} = \frac{(2+\sqrt{2})V_{dc}}{\pi} \sin(\omega t - \phi) = 1.086 \cdot V_{dc} \sin(\omega t - \phi) \quad (7a)$$

The root-mean-square value of $V_{21}$ is therefore $$V_{21\_rms} \frac{1.086}{\sqrt{2}} \cdot V_{dc} = 0.77 \cdot V_{dc} \quad (7b)$$

Dividing (4) by (5) to relate $V_{21}$ and $V_{dc}$, and using (7b), one can relate $I_s$ and $\overline{I}_o$.

$$0.77 V_{dc} I_S = 0.75 V_{dc} \overline{I}_o \Rightarrow I_S = 0.974 \overline{I}_o \quad (8)$$

Figure 21:
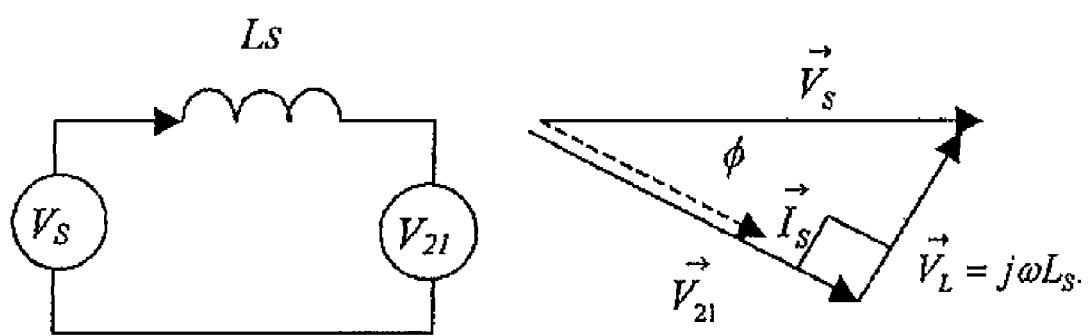
FIG. 21 shows a vectorial relationship in the equivalent circuit of FIG. 20.

Now consider the equivalent circuit and the vectorial relationship between $V_s$ and $V_{21}$ as shown in FIG. 21.

From FIG. 21

$$V_S^2 = V_{21}^2 + (\omega L_s I_s)^2 \quad (9)$$

and $$\vec{I}_s = \frac{\vec{V}_s - \vec{V}_{21}}{j\omega L_s} \quad (10)$$

From (6), it can be seen that $V_{21}$ depends on $V_{dc}$, which is approximately close to $1.33 V_o$ (approximated as a constant value). With the help of (8), $$\overline{I}_o = \frac{V_S - V_{21}}{0.974 \cdot \omega L_S} \quad (11)$$

Differentiating (11) will lead to $$\Delta \overline{I}_o = \frac{\Delta V_S}{0.974 \cdot \omega L_S} \quad (12)$$

Equation (12) is the important equation which shows that the input inductance Ls can be used to reduce the change of average output load current $\Delta \overline{I}_o$ for a given change in the input AC mains voltage $\Delta V_S$. Take an example. For an AC mains of 50 Hz, the angular frequency ω is equal to 100π, that is 314.16. For an Ls of 1H, the effect of input voltage fluctuation on the output average current will be reduced by 314.16 times as shown in (12). For an Ls of 2H, the reduction will be 618 times. For this sensitivity control to be effective, the size of the input inductor Ls has to be reasonably large (typically near to or in the order of Henry).

Figure 22:
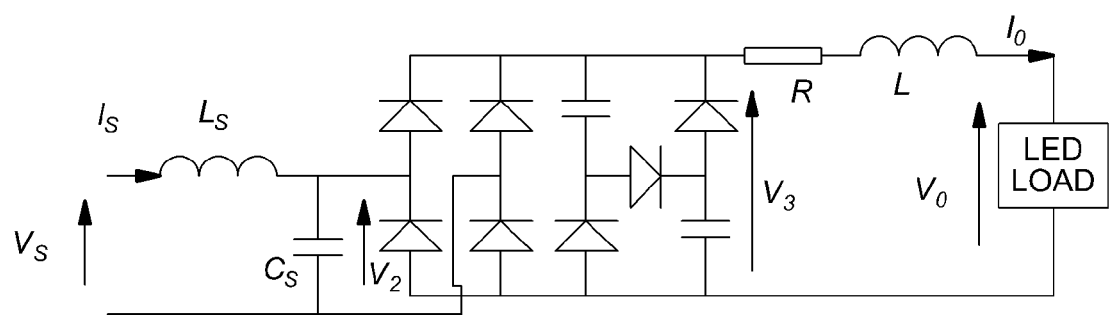
FIG. 22 shows a circuit according to a still further embodiment of the invention.

In order to provide a conducting path for the inductor current in Ls in case there is any problem in other part of the circuit which may create a discontinuation of current, a capacitor Cs can be placed to the second end of the input inductor as shown in FIG. 22. This LsCs arrangement will also play the additional role of input filter. But the main purpose of using a "large" Ls here is to reduce the sensitivity of the output load current (and thus output load power) of the proposed circuit to input voltage fluctuation.

In order to relate $\overline{I}_o$ with Vs, we start with modifying (9) with the help of (7b) and (8) gives:

$$V_S^2 = (0.77 V_{dc})^2 + [\omega L_S (0.974 \overline{I}_o)]^2 \quad (13)$$

Using (6), (13) becomes:

$$V_S^2 = \left[(0.77)\left(\frac{4}{3}\right)V_o\right]^2 + [\omega L_S (0.974 \overline{I}_o)]^2 \quad (14)$$

Solving (14) gives:

$$\overline{I}_o = \frac{\sqrt{V_S^2 - (1.072 \cdot V_o)^2}}{0.974 \cdot \omega L_s} \quad (15)$$

Note that $V_o$ can be determined from the number of LED devices in the LED strings. If Ls is chosen, then (15) provides the relationship between the average output current and the input ac mains voltage.

The LED load power is therefore:

$$\overline{P}_o = V_o \cdot \frac{\sqrt{V_S^2 - (1.072 \cdot V_o)^2}}{0.974 \cdot \omega L_s}$$

From the above it can be seen that by providing an input inductor in series between the AC supply voltage and the diode rectifier the sensitivity of the LED power to fluctuation in the AC supply voltage can be reduced.

Figure 23:
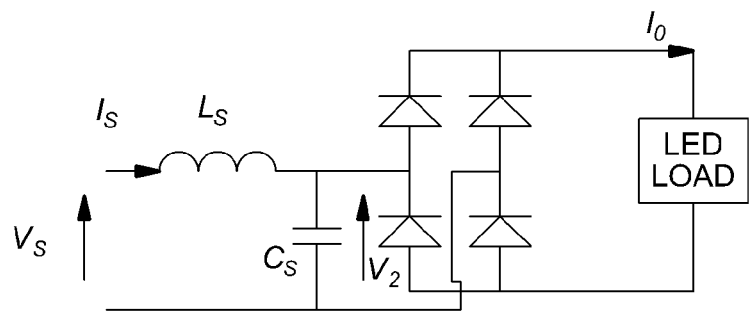
FIG. 23 shows a circuit according to a still further embodiment of the invention.

Indeed the provision of an input inductor in series between the AC supply voltage and the diode rectifier may have useful applications as a means for limiting variations in the power of the LED load in circuits that do not include voltage ripple reduction. FIG. 23 shows an example of such a circuit where the input inductor $L_s$ is provided in series between the AC supply voltage $V_s$ and a diode rectifier the output of which is provided directly to the load. As with the circuit of FIG. 22 a capacitor $C_s$ may be provided in parallel between the input inductor and the diode rectifier to provide a conducting path in the event of any short-circuit or other problem in another part of the circuit, and also to provide a filtering function.

Figure 24:
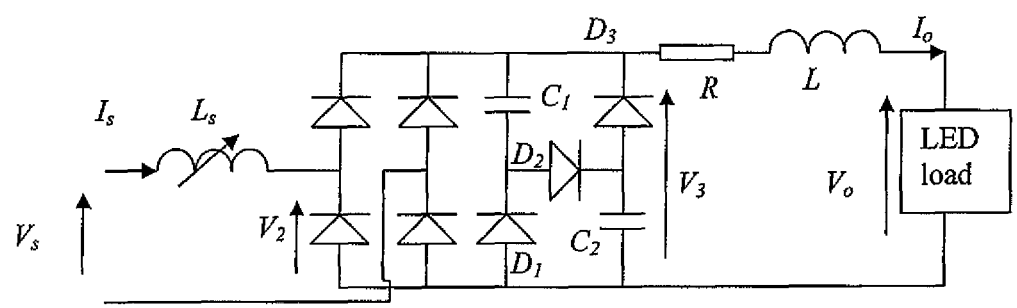
FIG. 24 shows a circuit according to an embodiment of the invention in which the circuit includes a variable inductor $L_s$.

In another embodiment, the lighting system described above can become a dimmable system by using a variable input inductor $L_s$, as shown in FIG. 24. As explained previously, the use of the input inductor of a reasonably large size is to reduce the LED power sensitivity against input voltage variation. The relationship of the variation of the output current (which affects the LED power) with the input voltage variation has been shown as:

$$\Delta \bar{I}_o = \frac{\Delta V_S}{0.974 \cdot \omega L_S}$$

The output dc current can be expressed as:

$$\bar{I}_o = \frac{V_S - V_{21}}{0.974 \cdot \omega L_S}$$

This equation means that the size of the input inductor can affect the power of the LED load. If the inductance of the input inductor Ls can be changed, a dimming function becomes possible. By using a variable inductor Ls as shown in FIG. 24, the power control of the LED load can be achieved.

Figure 25:
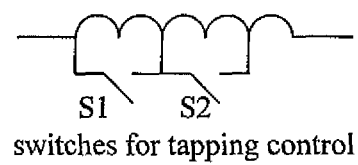
FIG. 25 shows the variable inductor $L_s$ of FIG. 24 based on tapping control.
Figure 26:
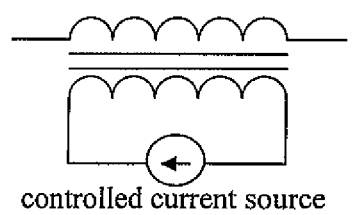
FIG. 26 shows the variable inductor $L_s$ of FIG. 24 based on core saturation.

The variable inductor can be implemented in various forms. For example, FIG. 25 shows an inductor with tapping control. By controlling the switch or switches, labeled as S1 and S2 in the present embodiment, to determine the number of turns in the inductor, the inductance value can be controlled. FIG. 26 shows another implementation of a variable inductor using a DC current in an auxiliary winding to alter the magnetic property (such as saturation level) of the core in order to vary the inductance value.

A further aspect of the invention refers more generally to valley-fill circuits used in reducing the DC output voltage ripple and/or current ripple in AC-DC power conversion. Based on the ratio of the capacitors used in the valley-fill circuits, the output voltage ripple can be further controlled and reduced. Thus, it can be used to provide a DC voltage source with an even more reduced voltage variation than that, for example, described above. Further, if an inductor is connected to the output of the valley-fill circuit in order to turn the voltage source into a current source, a current source with a further reduced current ripple can also be generated.

This further aspect of the present invention is particularly suitable to a variety of applications in which a fairly constant output current source is required. Thus, although this aspect of the invention will be described with reference to drivers for LED loads for general lighting applications such as those described above, this aspect of the invention can be applied more generally.

Valley-fill circuits have been proposed as passive methods (without active power switches) for input power factor corrections in AC-DC power conversion circuits and have been adopted in low-cost applications such as electronic ballasts and AC-DC converters. Modified versions of valley-fill circuits have also been suggested for power factor correction. Two common features shared by these valley-fill applications are (i) the valley-fill circuits are used primarily for shaping the input current in the AC-DC power conversion circuit for improving the power factor and (ii) use capacitors of equal capacitance value in the individual circuits.

As described above, valley-fill circuits are used for reducing the output DC voltage ripple or variation so that a fairly constant current source can be generated with the help of a filter inductor. One preferred embodiment of such a circuit is shown in FIG. 18. In traditional applications of valley-fill circuits, the two capacitors C1 and C2 are of the same capacitance value. This will allow the output voltage to be smaller than that of a diode bridge, i.e. the output voltage ripple can be reduced by about 50%.

Figure 27:
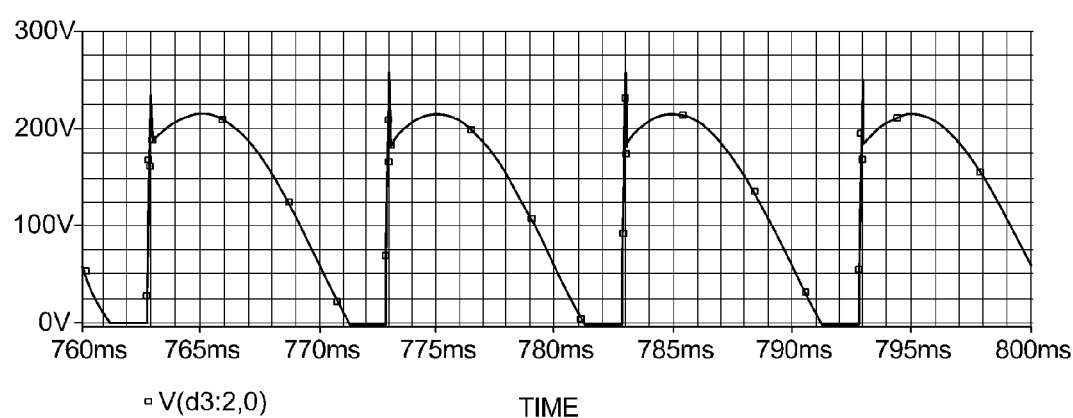
FIG. 27 is a graph showing the output voltage of a diode bridge only circuit.

If the valley-fill circuit in FIG. 18 is not used, the front-end diode rectifier provides a rectified output voltage as shown in FIG. 27. It can be seen that the rectified DC voltage peaks at the maximum value of the input sinusoidal voltage and then drops to zero. However, when the valley-fill circuit is provided with C1=C2=220 µF, the output DC voltage feeding the filter inductor L and LED load has a much reduced voltage ripple as displayed in FIG. 28(a). In this case, the maximum voltage is close to 180V and minimum voltage is close to 90V.

It should be noted that smaller capacitors such as C1=C2=22 µF can also be used. For capacitance of this low magnitude, electrolytic capacitors which have short lifetimes are not needed. FIG. 28(b) shows the output DC voltage of the valley-fill circuit with these smaller capacitors. Also voltage charging and discharging in the capacitors becomes obvious, as shown in FIG. 28(b), but the average voltage is close to that in FIG. 28(a).

Figure 28A:
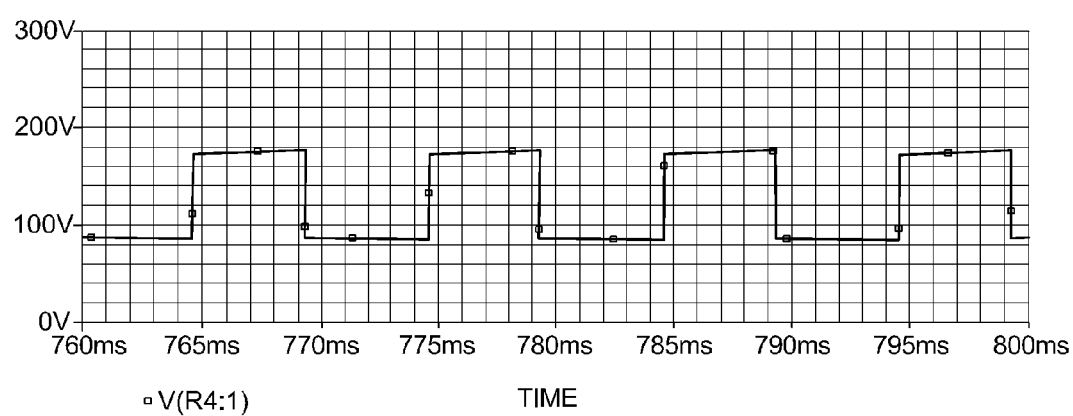
FIG. 28(*a*) is a graph showing the output voltage of the circuit of FIG. 18 in which C1=C2=220 μF.
Figure 28B:
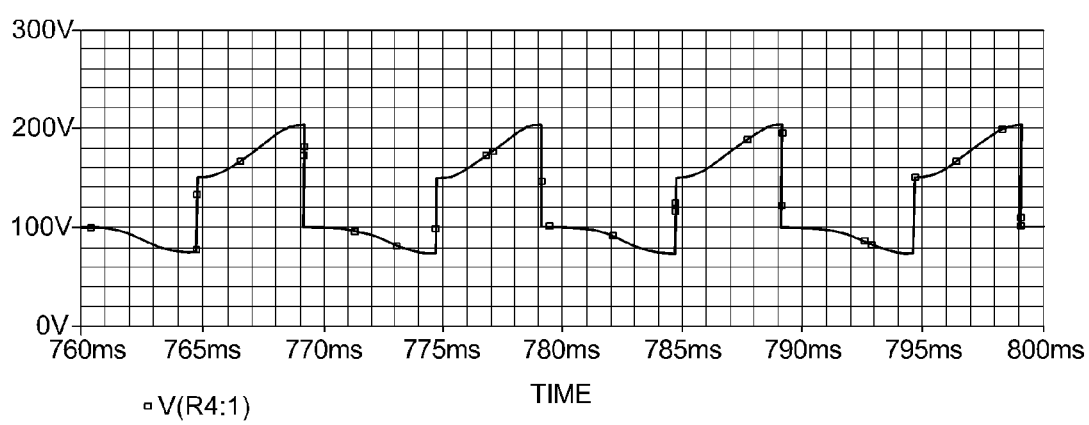

In the cases of FIG. 28(a) and FIG. 28(b), the output DC voltage ripple is about 50% of the maximum value. This is a typical feature of valley-fill circuits where C1 and C2 are identical. When the voltage $V_2$ is at its peak, the output voltage of the valley-fill circuit, which is clamped by the voltage across the LED load, will reach its maximum value. The rectified input current charges the two identical capacitors C1 and C2 through the diode $D_2$ equally and hence the two capacitor voltages are equal at this moment. Note that this voltage for C2 (half of the maximum DC voltage) is the maximum voltage of C2. Therefore, only full maximum voltage or half maximum voltage levels appear in the output voltage of the valley-fill circuit if C1 and C2 are large enough and of equal capacitance. Note that the lower DC voltage is actually the voltage across C2. With a voltage ripple reduced to 50%, the size of the filter inductor L can be reduced too.

Figure 29:
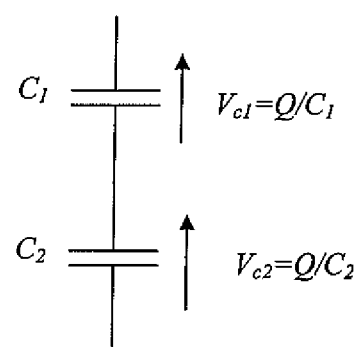
FIG. 29 show capacitors C1 and C2 connected in series.

However, the output DC voltage of the valley-fill circuit can be further reduced so as to further reduce the output ripple in the DC current and/or the size of the filter inductor. For capacitors connected in series, it is well known that the voltage of across each capacitor depends on the size of the capacitance. FIG. 29 shows one example of two capacitors connected in series. Note that the current flow into this series circuit branch is the same in the two capacitors regardless of their capacitance. That is to say, the capacitors have the same amount of charge for a given series current flow. The voltage across each capacitor is inversely proportional to the size of the capacitor.

Figure 30:
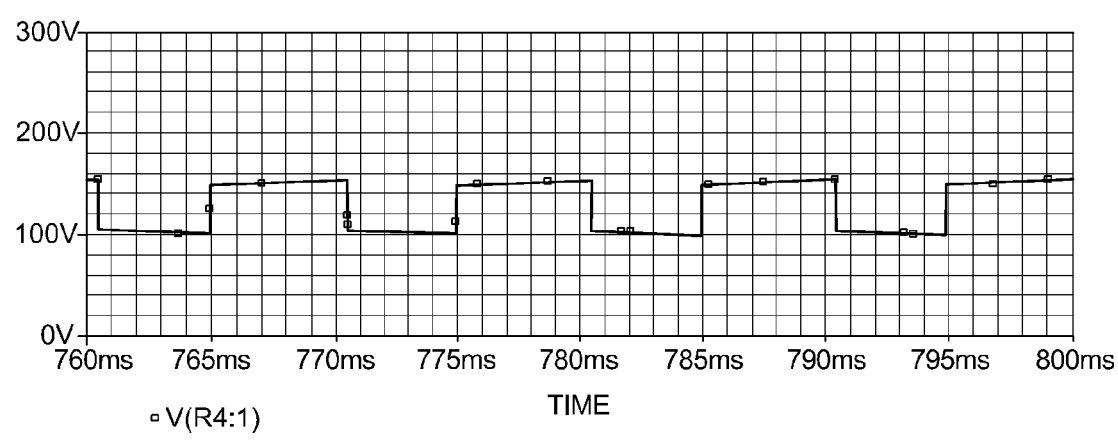
FIG. 30 is a graph showing the output voltage of the circuit of FIG. 18 in which C1=6600 μF and C2=330 μF.

In order to increase the lower DC voltage level (i.e. voltage across C2), one can select the capacitance of C2 to be smaller than that of C1 (i.e. C1>C2). This rule ensures that the voltage across C2 is higher than 50% of the maximum DC voltage. In order to confirm this concept, C1 and C2 are changed to 6600 µF and 330 µF, respectively. FIG. 30 shows the resulting output DC voltage of the valley-fill circuit if this is done. It can be seen that the voltage ripple is now reduced to about 30%.

Thus, specifying C1>C2 further reduces the output voltage ripple in the valley-fill circuit so as to reduce the ripple in the output inductor current and/or the size of the filter inductor.

It will be noted that any capacitors, including electrolytic capacitors, can be used. However, non-electrolytic capacitors are preferred since these lead to longer lifetimes and higher reliability.

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. An LED lighting system comprising in sequence:
   a rectification circuit for rectifying an AC input power and generating a rectified DC power;
   a first circuit for reducing the voltage ripple of said rectified DC power;
   a second circuit having a coupled inductor with a capacitor, wherein the second circuit is arranged to generate a current source; and
   at least one LED receiving said current source as an input;
   wherein the power supplied to said at least one LED is permitted to vary, and wherein the operating and/or design parameters of said at least one LED are chosen such that the variation in luminous flux resulting from the variation in power is not observable to the human eye.

2. The LED lighting system of claim 1, wherein said voltage ripple reducing circuit is a valley-fill circuit located between said rectification circuit and said second circuit.

3. The LED lighting system of claim 2, wherein said valley-fill circuit includes a first capacitor and a second capacitor.

4. The LED lighting system of claim 3, wherein the first and second capacitors have the same capacitance.

5. The LED lighting system of claim 3, wherein the first and second capacitors have different capacitances such that the voltage ripple of said rectified DC power is further reduced.

6. The LED lighting system of claim 2, wherein said valley-fill circuit includes a voltage-doubler.

7. The LED lighting system of claim 1, wherein said second circuit comprises an inductor.

8. The LED lighting system of claim 1, wherein said second circuit is a current ripple reduction circuit.

9. The LED lighting system of claim 1, wherein means are provided for controlling the sensitivity of the LED power to fluctuations in the voltage of the AC input power.

10. The LED lighting system of claim 9, wherein said means for controlling the sensitivity of the LED power to fluctuations in the voltage of the AC input power comprises an inductor provided in series between the AC input and the diode rectification circuit.

11. The LED lighting system of claim 10 further comprising a capacitor provided in parallel between the said inductor and the said diode rectification circuit.

12. The LED lighting system of claim 10, wherein said inductor is a variable inductor controllable such that the at least one LED is dimmable.

13. The LED lighting system of claim 1, wherein means are provided for varying the AC input power such that the at least one LED is dimmable.

14. The LED lighting system of claim 13, wherein said means for varying the AC input power comprises a variable inductor provided in series between the AC input and the diode rectification circuit.

15. The LED lighting system of claim 14, wherein said variable inductor is provided with tapping control.

16. The LED lighting system of claim 14, wherein said variable inductor is provided with an auxiliary winding having a DC current to alter a magnetic property of the core in order to vary the inductance value of said variable inductor.

17. An LED lighting system comprising:
   an AC input power source;
   a rectification circuit for rectifying an AC input power and generating a rectified DC power; and
   an inductor provided in series between the AC input power source and the rectification circuit, wherein said inductor is a variable inductor controllable such that the LED lighting system is dimmable.

18. The LED lighting system of claim 17 further comprising a capacitor provided in parallel between the said inductor and the said diode rectification circuit.

19. The LED lighting system of claim 17, wherein said variable inductor is provided with tapping control.

20. The LED lighting system of claim 17, wherein said variable inductor is provided with an auxiliary winding having a DC current to alter a magnetic property of the core in order to vary the inductance value of said variable inductor.

21. A method of operating a LED lighting system comprising the steps of:
   rectifying an AC input voltage to generate a rectified DC power;
   reducing the voltage ripple of said rectified DC power;
   generating a current source from said voltage ripple reduced rectified DC power; and
   providing said current source as an input to at least one LED, wherein the power supplied to said at least one LED is permitted to vary by use of a variable inductor, and wherein the operating and/or design parameters of said at least one LED are chosen such that the variation in luminous flux resulting from the variation in power is not observable to the human eye.

22. The method of claim 21, wherein a thermal characteristic of the at least one said LED is chosen such that the variation in luminous flux resulting from the variation in power is not observable to the human eye.

23. The method of claim 22, wherein said thermal characteristic comprises the design of the heatsink.

24. The method of claim 22, wherein said thermal characteristic comprises the provision of forced cooling or natural cooling.

25. The method of claim 21, wherein a valley-fill circuit is used to reduce the voltage ripple of the rectified DC power.

26. The method of claim 25, wherein the valley-fill circuit is provided with a first capacitor and a second capacitor.

27. The method of claim 26, wherein the first capacitor and the second capacitor have the same capacitance.

28. The method of claim 26, wherein the first capacitor is selected with a different capacitance to the second capacitor such that the valley-fill circuit is used to further reduce the voltage ripple of the rectified DC power.

29. The method of claim 25, wherein said valley-fill circuit includes a voltage-doubler.

30. The method of claim 21, further comprising the step of reducing the current ripple of said current source.

31. The method of claim 30, wherein a coupled inductor with a capacitor is used to reduce the current ripple.

32. The method of claim 21, further comprising reducing the sensitivity of the LED power to fluctuations in the AC input voltage.

33. The method of claim 31, further comprising providing an inductor to reduce the sensitivity of the LED power to fluctuations in the AC input voltage before rectifying the AC input voltage.

34. The method of claim 33, further comprising controllably varying the inductor such that the at least one LED is dimmable.

35. The method of claim 21, further comprising varying the AC input voltage such that the at least one LED is dimmable.

36. The method of claim 21, further comprising controlling the variable inductor with tapping control.

37. The method of claim 21, further comprising providing the variable inductor with an auxiliary winding having a DC current and altering a magnetic property of the core in order to vary the inductance value of said variable inductor.

38. An LED lighting system comprising in sequence:
a rectification circuit for rectifying an AC input power and generating a rectified DC power;
a first circuit for reducing the voltage ripple of said rectified DC power;
a second circuit having a coupled inductor with a capacitor, wherein the second circuit is arranged to generate a current source; and
at least one LED receiving said current source as an input;
wherein said inductor is a variable inductor controllable such that the at least one LED is dimmable; and
wherein means are provided for controlling the sensitivity of the LED power to fluctuations in the voltage of the AC input power, said means for controlling comprising an inductor provided in series between the AC input and the diode rectification circuit.

39. An LED lighting system comprising in sequence:
a rectification circuit for rectifying an AC input power and generating a rectified DC power;
a first circuit for reducing the voltage ripple of said rectified DC power;
a second circuit having a coupled inductor with a capacitor, wherein the second circuit is arranged to generate a current source; and
at least one LED receiving said current source as an input;
wherein means are provided for varying the AC input power such that the at least one LED is dimmable.

40. The LED lighting system of claim 39, wherein said means for varying the AC input power comprises a variable inductor provided in series between the AC input and the diode rectification circuit.

41. The LED lighting system of claim 40, wherein said variable inductor is provided with tapping control.

42. The LED lighting system of claim 40, wherein said variable inductor is provided with an auxiliary winding having a DC current to alter a magnetic property of the core in order to vary the inductance value of said variable inductor.

* * * * *